(12) United States Patent
Fukuda et al.

(10) Patent No.: US 10,895,844 B2
(45) Date of Patent: Jan. 19, 2021

(54) GEAR TRAIN MECHANISM OF TIMEPIECE

(71) Applicant: CITIZEN WATCH CO., LTD., Nishitokyo (JP)

(72) Inventors: Tadahiro Fukuda, Kokubunji (JP); Shinpei Fukaya, Kodaira (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 96 days.

(21) Appl. No.: 16/312,950

(22) PCT Filed: Jun. 19, 2017

(86) PCT No.: PCT/JP2017/022552
§ 371 (c)(1),
(2) Date: Dec. 21, 2018

(87) PCT Pub. No.: WO2017/221897
PCT Pub. Date: Dec. 28, 2017

(65) Prior Publication Data
US 2019/0163136 A1    May 30, 2019

Related U.S. Application Data

(63) Continuation-in-part of application No. PCT/JP2017/014822, filed on Apr. 11, 2017.

(30) Foreign Application Priority Data

Jun. 23, 2016   (JP) .................................. 2016-124837

(51) Int. Cl.
*F16H 55/00*   (2006.01)
*G04B 13/02*   (2006.01)
*F16H 55/08*   (2006.01)

(52) U.S. Cl.
CPC ........... *G04B 13/027* (2013.01); *F16H 55/08* (2013.01); *F16H 55/0806* (2013.01); *G04B 13/02* (2013.01)

(58) Field of Classification Search
CPC .... F16H 55/08; F16H 55/0806; G04B 13/027
See application file for complete search history.

(56) References Cited

U.S. PATENT DOCUMENTS 3,918,315 A   11/1975   Rouverol
4,108,017 A    8/1978   Rouverol
(Continued)

FOREIGN PATENT DOCUMENTS

CH        699679 A2    4/2010
CN       86205718 U    5/1987
(Continued)

OTHER PUBLICATIONS

European Search Report; Application No. 17815365.6; dated Oct. 25, 2019; 8 pages.
(Continued)

*Primary Examiner* — Jake Cook
(74) *Attorney, Agent, or Firm* — Knobbe, Martens, Olson & Bear, LLP

(57) ABSTRACT

A gear train mechanism of a timepiece is formed by a gear having an involute tooth profile, which is easily manufactured, and a pinion that meshes with the gear. In order to reduce a fluctuation in torque to be transmitted, a gear train mechanism of a timepiece includes a gear including a tooth having a tooth profile of an involute curve and a pinion including a tooth meshing with the tooth of the gear to transmit and receive a torque, wherein the torque to be transmitted from the gear to the pinion is substantially constant at least in a part of a first half of a meshing period of the gear and the pinion.

9 Claims, 13 Drawing Sheets

(56) References Cited

U.S. PATENT DOCUMENTS

| | | | |
|---|---|---|---|
| 4,640,149 A | 2/1987 | Drago | |
| 4,651,588 A * | 3/1987 | Rouverol | F16H 55/0806 74/462 |
| 8,833,192 B2 * | 9/2014 | Helfer | F16H 55/08 74/457 |
| 2012/0118093 A1 | 5/2012 | Helfer | |

FOREIGN PATENT DOCUMENTS

| | | |
|---|---|---|
| CN | 102563007 A | 7/2012 |
| EP | 2172815 | 4/2010 |
| EP | 2453321 A1 | 5/2012 |
| GB | 153581 A | 11/1919 |
| JP | 2002-227967 A | 8/2002 |
| JP | 2012-102877 A | 5/2012 |
| WO | 2017221897 A1 | 12/2017 |

OTHER PUBLICATIONS

Chinese Office Action; Application No. 201780031446.2; dated Feb. 25, 2020.

* cited by examiner

THE NUMBER OF TEETH ON PINION [Z]

ROTATION ANGLE [deg]

GEAR TRAIN MECHANISM OF TIMEPIECE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and made a part of this specification.

TECHNICAL FIELD

The present disclosure relates to a gear train mechanism of a timepiece.

BACKGROUND ART

A timepiece includes a gear train mechanism formed by a plurality of gear devices which meshes with each other to transmit power generated in a power source while increasing and decreasing a speed of the power. The gear device includes a gear and a pinion which are fixed to a common shaft. The gear has a diameter and the number of teeth larger than those of the pinion. The gear of one gear device meshes with the pinion of another gear device.

The gears and the pinions of these gear devices include an involute tooth profile or a circular arc tooth profile.

When the gear meshes with the pinion to transmit a torque between the gear and the pinion, it is preferable for a fluctuation in toque to be transmitted to be as small as possible. A gear train mechanism having tooth profiles of a gear and a pinion defined by a specific calculation formula is therefore proposed (see JP5520278B, for example).

SUMMARY

Technical Problem

However, it is not easy to manufacture such a gear train mechanism because the gear train mechanism described in Patent Literature 1 includes a gear and a pinion both having a tooth profile defined by the above calculation formula.

The present disclosure has been made in view of the above circumstance, and an object of the present disclosure is to provide a gear train mechanism of a timepiece formed by a gear having an involute tooth profile, which is easily manufactured, and a pinion that meshes with the gear. Such a gear train mechanism of a timepiece reduces a fluctuation in torque to be transmitted and stably operates.

Solution to Problem

A gear train mechanism of a timepiece of this disclosure includes a gear including a tooth having a tooth profile of an involute curve; and a pinion including a tooth meshing with the tooth of the gear to transmit and receive a torque, wherein the torque to be transmitted from one of the gear and the pinion to the other of the gear and the pinion is substantially constant at least in a part of a first half of a meshing period of the gear and the pinion.

DESCRIPTION OF EMBODIMENT

Hereinafter, embodiments of a gear train mechanism of a timepiece according to the present disclosure are described with reference to the drawings.

Embodiment 1

Configuration of Gear Train Mechanism

Figure 1A:
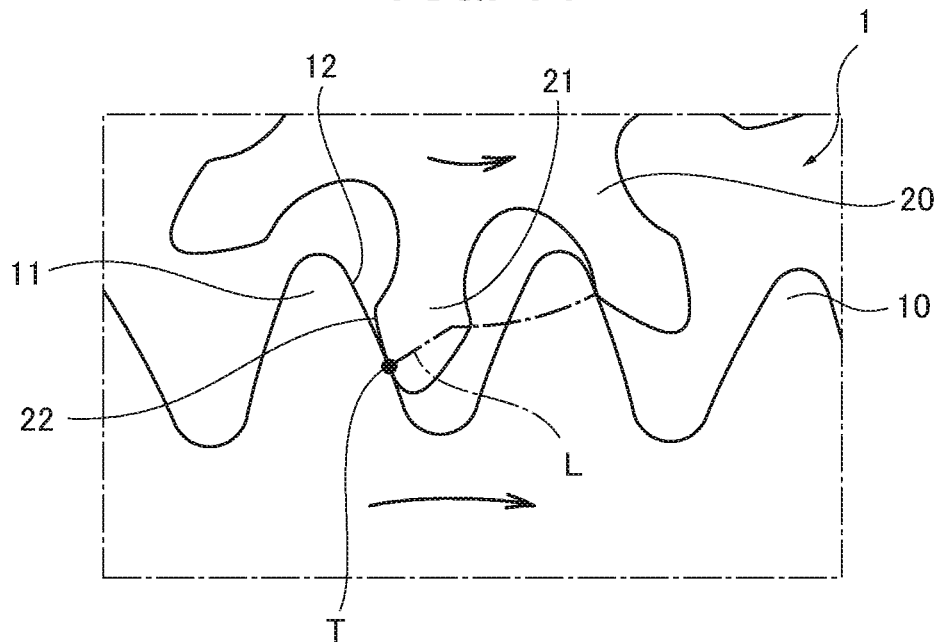
FIG. 1A is a schematic diagram illustrating a gear train mechanism of a portable timepiece (for example, watch) as one embodiment of the present disclosure at the start of contact (approach contact) of a tooth of a driving gear and a tooth of a driven pinion.

FIG. 1A is a schematic diagram illustrating a gear train mechanism 1 of a portable timepiece (for example, watch) as one embodiment of the present disclosure at the start of the contact of a tooth 11 of a driving gear 10 and a tooth 21 of a driven pinion 20. The gear train mechanism 1 illustrated in the figure includes the gear 10 as a second wheel and the pinion 20 as a third wheel. The gear 10 meshes with the pinion 20 to transmit a torque from the gear 10 to the pinion 20 through a meshing point T at which the gear 10 meshes with the pinion 20. The pinion 20 rotates in an arrow direction (counterclockwise direction in FIG. 1A) along with the rotation of the gear 10 in an arrow direction (clockwise direction in FIG. 1A). By this rotation, the meshing point T draws a track L illustrated by a one dot chain line.

The gear 10 has 72 teeth 11 and a module size, m=0.075 mm, for example. The module size is defined by International Organization for Standard (ISO) as a unit for representing a size of a tooth. A tooth profile 12 of each tooth 11 is defined by an involute curve such that a pressure angle $\alpha 2$ is set to 22 degrees. The pressure angle is defined by Japan Industrial Standard (JIS B 0102) as an angle formed by a radial line and a line tangent to a tooth profile at one point of a tooth face.

On the other hand, the pinion 20 has 8 teeth 21 and a module size, m=0.075 mm, for example. A tooth profile 22 of each tooth 21 is defined by a constant torque curve having a substantial constant torque to be transmitted from a virtual gear to the pinion 20 in the meshing period from the start to the end of the meshing of the tooth 21 of the pinion 20 and the virtual gear. In this case, the constant torque curve meshes with the involute virtual gear having a pressure angle $\alpha 1$ (for example, 23.5 degrees) larger than the pressure angle $\alpha 2$ of the tooth 11. Accordingly, the torque to be transmitted from the gear 10 to the pinion 20 becomes substantially constant at least in a part of a first half (for example, approach contact range) of the meshing period of the tooth 11 of the gear 10 and the tooth 21 of the pinion 20. The distance between the rotation center of the gear 10 and the rotation center of the pinion 20 (center distance) is 3 mm, for example.

Operation of Gear Train Mechanism

Figure 1B:
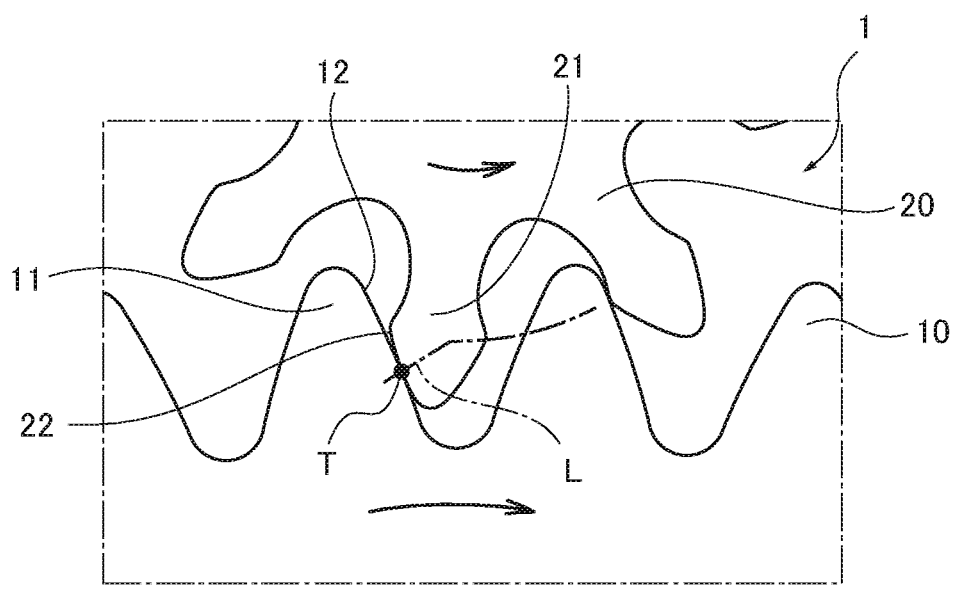
FIG. 1B is a schematic diagram illustrating the gear train mechanism of the portable timepiece from the start of meshing to the end of the approach contact.
Figure 1C:
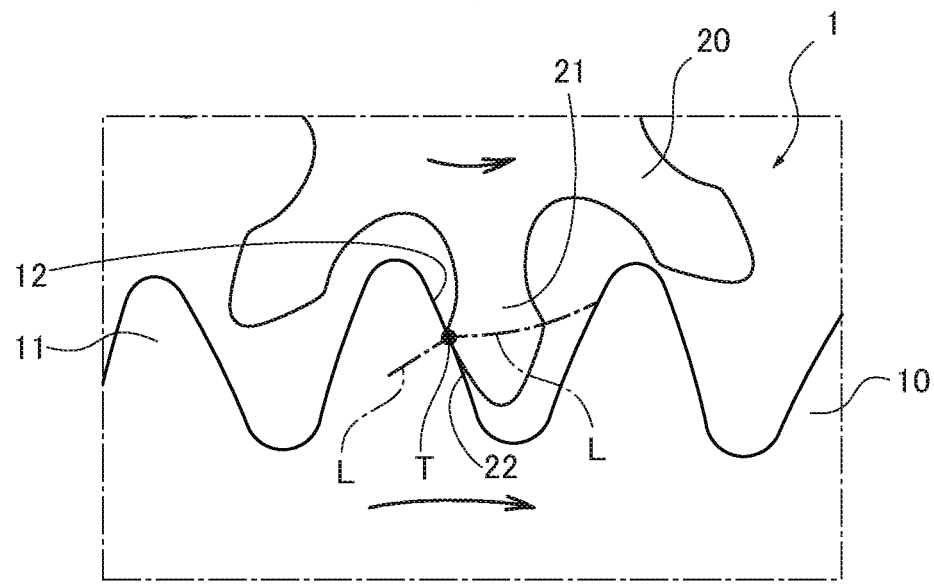
FIG. 1C is a schematic diagram illustrating the gear train mechanism of the portable timepiece at the end of the approach contact and the start of recess contact.

The operation of the gear train mechanism 1 constructed as described above is described. FIGS. 1B, 1C, 1D, 1E, 1F are schematic diagrams each illustrating the gear train mechanism 1. FIG. 1A, 1B, 1C illustrate the gear train mechanism 1 in the time-series order in the approach contact range in the first half of the above meshing period. Namely, FIG. 1A illustrates the gear train mechanism 1 at the meshing start, FIG. 1B illustrates the gear train mechanism 1 from the meshing start to the end of the approach contact, and FIG. 1C illustrates the gear train mechanism 1 at the end of the approach contact and the start of the recess contact.

The approach contact and the recess contact are defined by Japan Industrial Standard (JIS B 0102). The approach contact is contact at any point on a path of contact between a pitch point and an addendum circle of a driven gear (pinion 20 in this embodiment). The recess contact is contact at any point on a path of contact between an addendum circle of a driving gear and a pitch point.

Figure 1D:
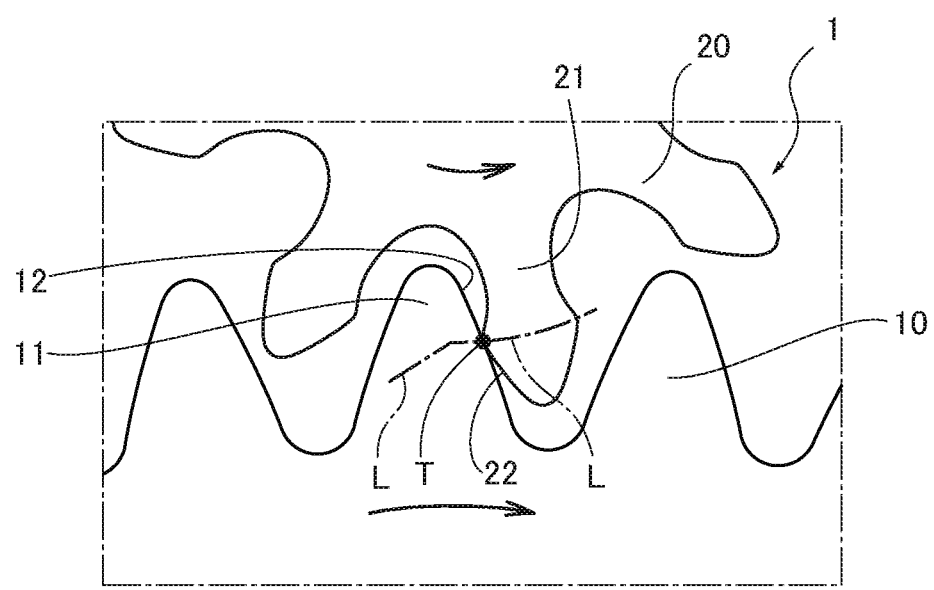
FIG. 1D is a schematic diagram illustrating the gear train mechanism of the portable timepiece from the start of the recess contact to the end of the recess contact (part 1).
Figure 1E:
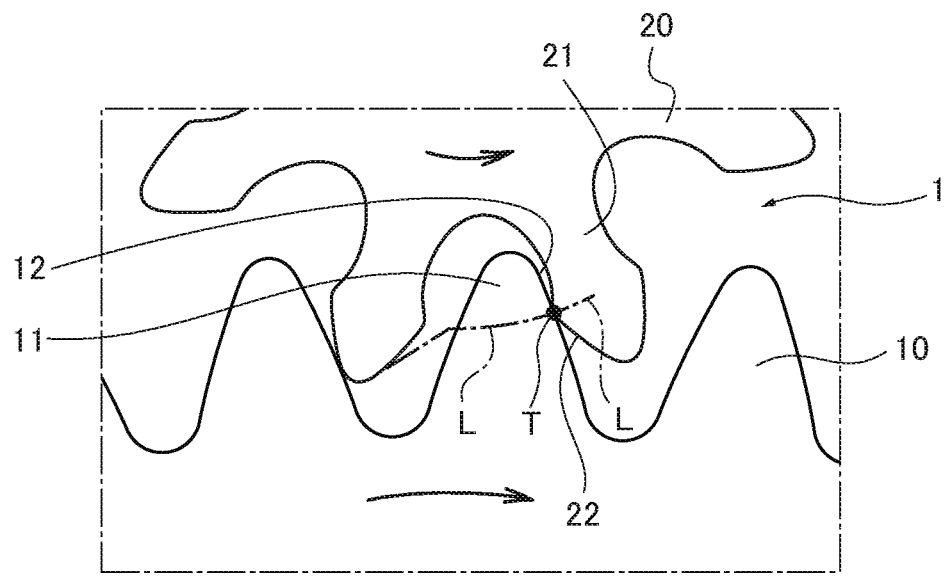
FIG. 1E is a schematic diagram illustrating the gear train mechanism of the portable timepiece from the start of the recess contact to the end of the recess contact (part 2).
Figure 1F:
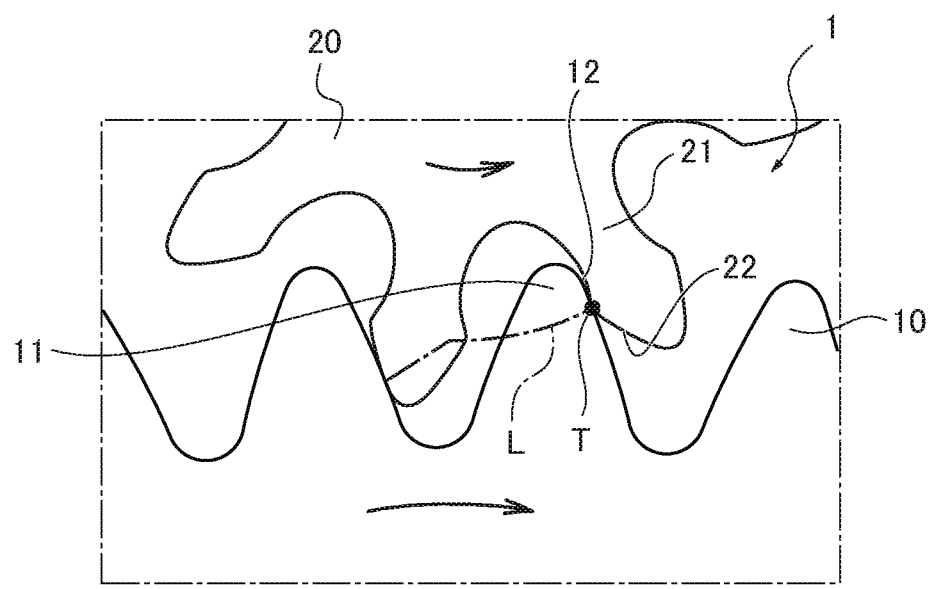
FIG. 1F is a schematic diagram illustrating the gear train mechanism of the portable timepiece at the end of the recess contact.

FIGS. 1C, 1D, 1E, 1F are schematic diagrams each illustrating the gear train mechanism 1. FIGS. 1C, 1D, 1E, 1F illustrate the gear train mechanism 1 in the time-series order in the recess contact range in the second half of the above meshing period. Namely, FIG. 1C illustrates the gear train mechanism 1 at the end of the approach contact and the start of the recess contact, FIGS. 1D, 1E illustrate the gear train mechanism 1 from the start of the recess contact to the end of the recess contact (part 1, part 2), and FIG. 1F illustrates the gear train mechanism 1 at the end of the recess contact. In addition, FIG. 1D is between FIG. 1C and FIG. 1E in the time-series order.

Figure 2:
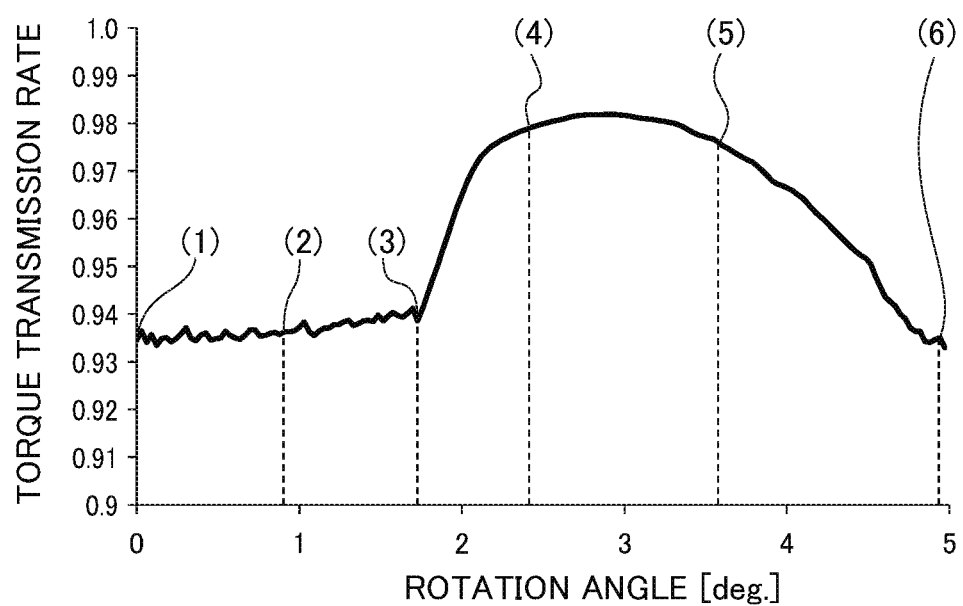
FIG. 2 is a graph showing a torque transmission rate from the gear to the pinion when the gear meshes with the pinion in the gear train mechanism of the timepiece according to the embodiment.

FIG. 2 is a graph showing a transmission rate (transmission efficiency) of a torque from the gear 10 to the pinion 20 when the gear 10 meshes with the pinion 20 in the gear train mechanism 1 of the timepiece of this embodiment. In the graph, the horizontal axis shows a rotation angle of the gear 10 and a vertical axis shows a torque transmission rate. In the graph, (1) denotes the meshing illustrated in FIG. 1A, (2) denotes the meshing illustrated in FIG. 1B, (3) denotes the meshing illustrated in FIG. 1C, (4) denotes the meshing illustrated in FIG. 1D, (5) denotes the meshing illustrated in FIG. 1E, and (6) denotes the meshing illustrated in FIG. 1F. The transmission rate of 1.0 shows 100% transmission, and the transmission rate of 0.9 shows 90% transmission (hereinafter the same).

According to the graph illustrated in FIG. 2, the gear train mechanism 1 of the timepiece of this embodiment has a substantial constant transmission rate (0.93 to 0.94) of the torque to be transmitted from the gear 10 to the pinion 20 in the approach contact range (range of about 1.7 degrees of rotation angle of gear 10) illustrated in FIGS. 1A, 1B, 1C.

The gear train mechanism 1 of the timepiece of this embodiment also has a transmission rate of the torque to be transmitted from the gear 10 to the pinion 20 in the recess contact range (range of about 3.3 degrees of rotation angle of gear 10) illustrated in FIGS. 1D, 1E, 1F. This transmission rate increases to be larger than that in the approach contact range, and decreases to about 0.93 to 0.94 in the approach contact range after exceeding 0.98.

Figure 3:
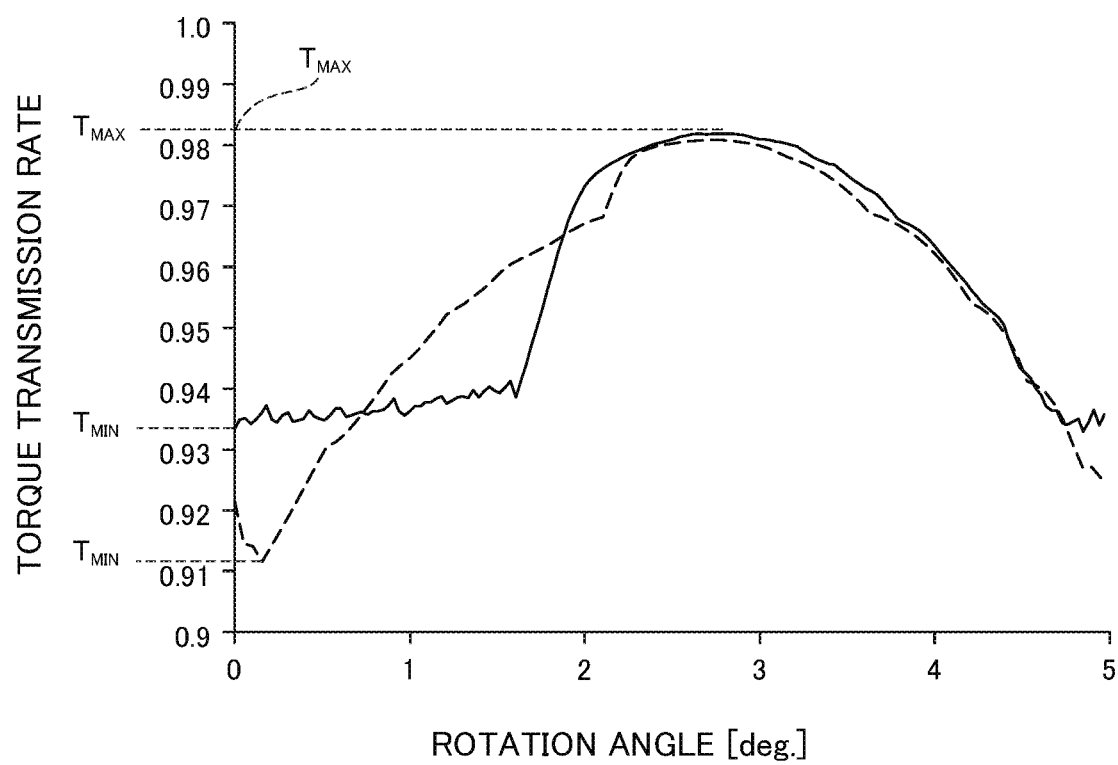
FIG. 3 is a graph showing a torque transmission rate (solid line) of the gear train mechanism of the embodiment and a torque transmission rate (broken line) of a conventional gear train mechanism of a timepiece to which the present disclosure is not applied.

FIG. 3 is a graph showing the torque transmission rate (solid line) of the gear train mechanism 1 of the timepiece of this embodiment and the torque transmission rate (broken line) of a conventional gear train mechanism of a timepiece to which the present disclosure is not applied. In FIG. 3, the horizontal axis shows the rotation angle of the gear 10 and the vertical axis shows the torque transmission rate. In FIG. 3, the torque transmission rate of the gear train mechanism 1 of the timepiece of this embodiment shown by the solid line is the same as that shown in FIG. 2. The torque transmission rate includes the minimum value $T_{MIN}$ and the maximum value $T_{MAX}$.

The conventional gear train mechanism of the timepiece illustrated by the broken line in FIG. 3 is a typical gear train mechanism formed by a gear having an involute tooth profile and a pinion having a tooth profile by ETA SA (not tooth profile of constant torque curve). The minimum value $T_{MIN}$ of the torque transmission rate of this gear train mechanism is slightly larger than 0.91, and this value is smaller than the minimum value $T_{MIN}$ of the torque transmission rate of the gear train mechanism 1 of this embodiment. The maximum value $T_{MAX}$ of the torque transmission rate of the typical gear train mechanism is substantially the same as the maximum value $T_{MAX}$ of the torque transmission rate of the gear train mechanism 1 of this embodiment.

The gear train mechanism 1 of the timepiece of this embodiment has a substantial constant torque transmission rate with a tolerance value of 0.01 or below in the approach contact range in the meshing period of the gear 10 and the pinion 20. As a result, the minimum value of the torque transmission rate of the gear train mechanism 1 is larger than the minimum value of the torque transmission rate in the typical gear train mechanism of the timepiece to which the present disclosure is not applied as illustrated by the broken line of FIG. 3. Accordingly, the torque fluctuation which is the difference between the maximum value and the minimum value of the torque transmission rates in the gear train mechanism 1 of the timepiece of the present disclosure reduces to be smaller than that of the conventional typical gear train mechanism of the timepiece, and the gear train mechanism 1 of the timepiece of this embodiment stably operates.

Modified Example

The gear train mechanism 1 of the timepiece of the embodiment includes the pinion 20 having 8 teeth 21. However, the number Z of the teeth 21 on the pinion 20 is not limited to 8. It is preferable for the number Z of the teeth 21 on the pinion 20 to be 7 to 15. When the number Z of the teeth 21 on the pinion 20 is equal to 6 or less, the pinion 20 inappropriately meshes with the gear 10. On the other hand, when the number Z of the teeth 21 on the pinion 20 is equal to 16 or more, the torque fluctuation is not a significant issue for the gear train mechanism 1. When the number Z of the teeth 21 on the pinion 20 is 7, 8, 9, 10, 11, 12, 13, 14, 15, the pinion 20 appropriately meshes with the gear 10 and the torque fluctuation reduces. In these cases, the tooth profile 22 of the tooth 21 of the pinion 20 is defined by a constant torque curve in the period in which the pinion 20 meshes with the virtual gear having the large pressure angle $\alpha 1$ as described above.

It is more preferable for the number Z of the teeth 21 on the pinion 20 of the gear train mechanism 1 to be 7 to 10. In this case, the torque fluctuation further reduces.

Figure 4:
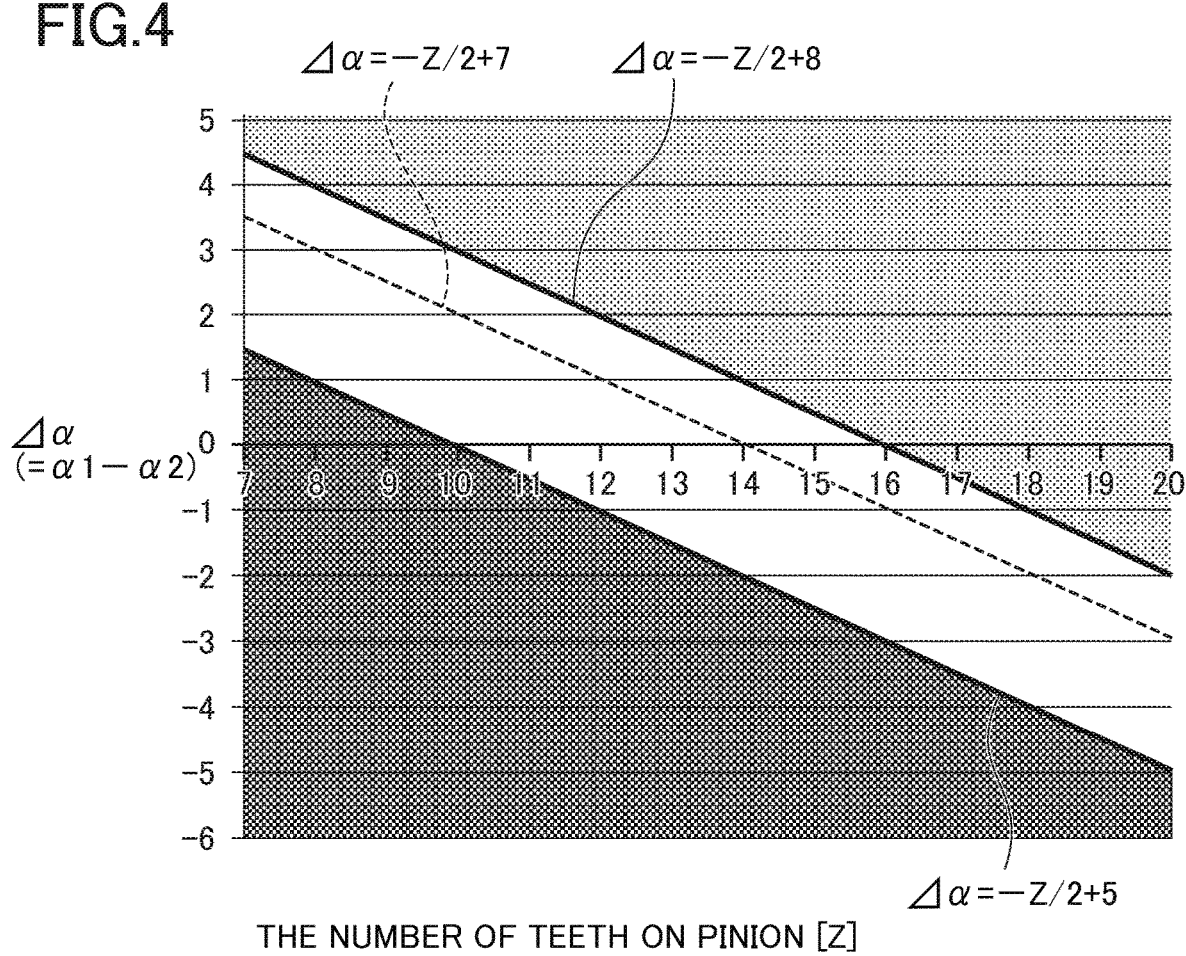
FIG. 4 is a graph showing correspondence between the number of teeth on the pinion and a difference in pressure angle.

FIG. 4 is a graph showing correspondence of the number Z of teeth on the pinion 20 and the difference in pressure angle $\Delta\alpha$. In this case, the difference in pressure angle $\Delta\alpha$ is a difference between the pressure angle $\alpha 2$ of the gear 10 with which the pinion 20 actually meshes and the pressure angle $\alpha 1$ of the virtual involute gear, i.e., $\Delta\alpha = \alpha 1 - \alpha 2$. In this case, the gear 10 includes the tooth 11 having the tooth profile 12 defined by the involute curve, and the pressure angle $\alpha 1$ is used for calculating the constant torque curve defining the tooth profile 22 of the tooth 21 of the pinion 20.

It is preferable for the gear train mechanism 1 of the timepiece of this embodiment to have the difference in pressure angle $\Delta\alpha$ larger than $-(Z/2)+5$ in the range of the number Z of teeth (=7, 8, 9, 10, 11, 12, 13, 14, 15) on the pinion 20 as illustrated in FIG. 4, i.e., $-(Z/2)+5<\Delta\alpha$. When the difference in pressure angle $\Delta\alpha$ is equal to $-(Z/2)+5$ or below, the addendum of the pinion 20 may contact the bottom of the gear 10. When the difference in pressure angle $\Delta\alpha$ is larger than $-(Z/2)+5$, the addendum of the pinion 20 may not contact the bottom of the gear 10.

It is also preferable for the gear train mechanism 1 of the timepiece of this embodiment to have the difference in pressure angle $\Delta\alpha$ smaller than $-(Z/2)+8$ in the range of the number Z of the teeth (=7, 8, 9, 10, 11, 12, 13, 14, 15) on the pinion 20 as illustrated in FIG. 4, i.e., $\Delta\alpha<-(Z/2)+8$. The torque transmission rate has a substantial constant value in the approach contact range and the maximum value in the recess contact range. The substantial constant value decreases and the maximum value increases in accordance with an increase in the difference in pressure angle $\Delta\alpha$, resulting in an increase in the torque fluctuation which is the difference in torque transmission rate. Accordingly, when the difference in pressure angle $\Delta\alpha$ is equal to $-(Z/2)+8$ or more, the torque fluctuation does not significantly reduce. When the difference in pressure angle $\Delta\alpha$ is smaller than $-(Z/2)+8$, the torque fluctuation further reduces.

It is more preferable for the gear train mechanism 1 of the timepiece of this embodiment to have the difference in pressure angle $\Delta\alpha$ of the range of $\Delta\alpha<-(Z/2)+7$ as shown by the broken line in the range of the number Z of teeth (=7, 8, 9, 10) on the pinion 20. In this range of $\Delta\alpha<-(Z/2)+7$, the torque fluctuation further reduces.

For the reasons stated above, when the number Z of teeth on the pinion 20 is 8, the difference $\Delta\alpha$ $(=\alpha 1 - \alpha 2)$ between the pressure angle $\alpha 1$ of the virtual involute gear and the pressure angle $\alpha 2$ of the gear 10 is set to be larger than 1.0 and smaller than 4.0 (preferably smaller than 3.0). In this case, the pressure angle $\alpha 1$ is used to calculate the constant torque curve defining the tooth profile 22 of the tooth 21 of the pinion 20. Such a difference $\Delta\alpha$ prevents the addendum of the pinion 20 from contacting a part of the gear 10 which is not required for torque transmission, for example, the bottom of the gear 10, achieving a gear train component of a timepiece having a substantial constant torque to be transmitted from the gear 10 to the pinion 20 at least in a part of the first half of the meshing period. The pinion 20 having the difference in pressure angle $\Delta\alpha$ smaller than 3.0 significantly reduces the torque fluctuation to be smaller than that of a pinion having the difference in pressure angle $\Delta\alpha$ smaller than 4.0.

Figure 5:
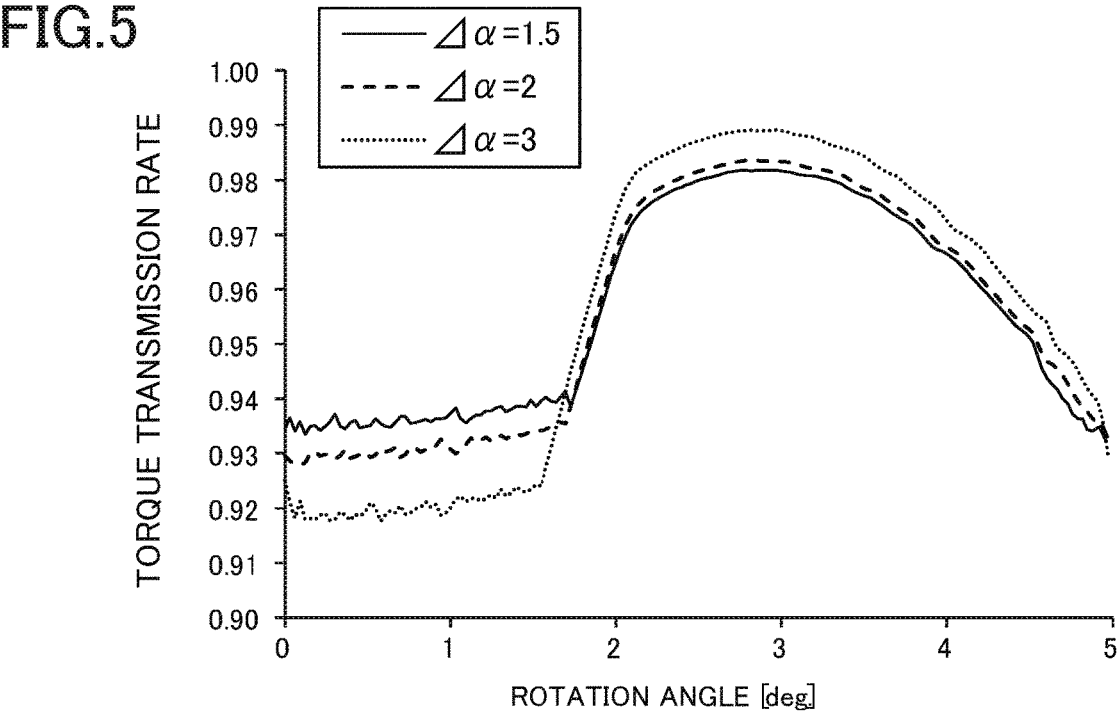
FIG. 5 is a graph showing torque transmission rates corresponding to FIG. 2 when the difference in pressure angle is changed to 1.5 degrees, 2 degrees, and 3 degrees in the gear train mechanism of the embodiment.

FIG. 5 is a graph corresponding to FIG. 2. The graph in FIG. 5 shows the torque transmission rate when the difference in pressure angle $\Delta\alpha$ is changed to 1.5 degrees, 2 degrees, and 3 degrees in the gear train mechanism 1 of this embodiment (for example, pinion 20 has 8 teeth and gear 10 has 72 teeth meshing with pinion 20). In the graph, the horizontal axis shows the rotation angle of the gear 10 and the vertical axis shows the torque transmission rate. The torque transmission rate when the difference in pressure angle $\Delta\alpha$ is 1.5 degrees in FIG. 5 is obtained by the gear train mechanism 1 of the above-described embodiment. The graph showing the torque transmission rate when the difference in pressure angle $\Delta\alpha$ is 1.5 degrees in FIG. 5 is the same as that in FIG. 2. In FIG. 5, when the difference in pressure angle $\Delta\alpha$ is 2 degrees, the value of the torque transmission rate which becomes substantially constant in the approach contact range decreases to be smaller than that when the difference in pressure angle $\Delta\alpha$ is 1.5 degrees, and the value of the torque transmission rate which becomes maximum in the recess contact range increases to be larger than that when the difference in pressure angle $\Delta\alpha$ is 1.5 degrees. The torque fluctuation therefore increases.

In FIG. 5, when the difference in pressure angle $\Delta\alpha$ is 3 degrees in FIG. 5, the value of the torque transmission rate which becomes substantially constant in the approach contact range further decreases to be smaller than that when the difference in pressure angle $\Delta\alpha$ is 2 degrees, and the value of the torque transmission rate which becomes the maximum in the recess contact range further increases to be larger than that when the difference in pressure angle $\Delta\alpha$ is 2 degrees. The torque fluctuation further increases. However, as long as the difference in pressure angle $\Delta\alpha$ is smaller than 4 degrees, the torque fluctuation reduces to be smaller than that of a gear train mechanism to which the present disclosure is not applied. Accordingly, it is preferable for the difference in pressure angle $\Delta\alpha$ to be smaller than $-(Z/2)+8$, in order to reduce the torque fluctuation. It is more preferable for the difference in pressure angle $\Delta\alpha$ to be smaller than $-(Z/2)+7$, in order to further reduce the torque fluctuation.

The tooth profile of the tooth 11 of the gear 10 in the gear train mechanism 1 of this embodiment is defined by an involute curve such that the pressure angle $\alpha 2$ is set to 22 degrees. However, this pressure angle $\alpha 2$ is not limited to 22 degrees, and may be, for example, 18 degrees, 19 degrees, 20 degrees, 21 degrees, 23 degrees, 24 degrees, and 25 degrees in addition to 22 degrees. The pressure angles $\alpha 1$, $\alpha 2$ may be a value including a decimal point such as 22.5 degrees and 23.4 degrees.

Figure 6:
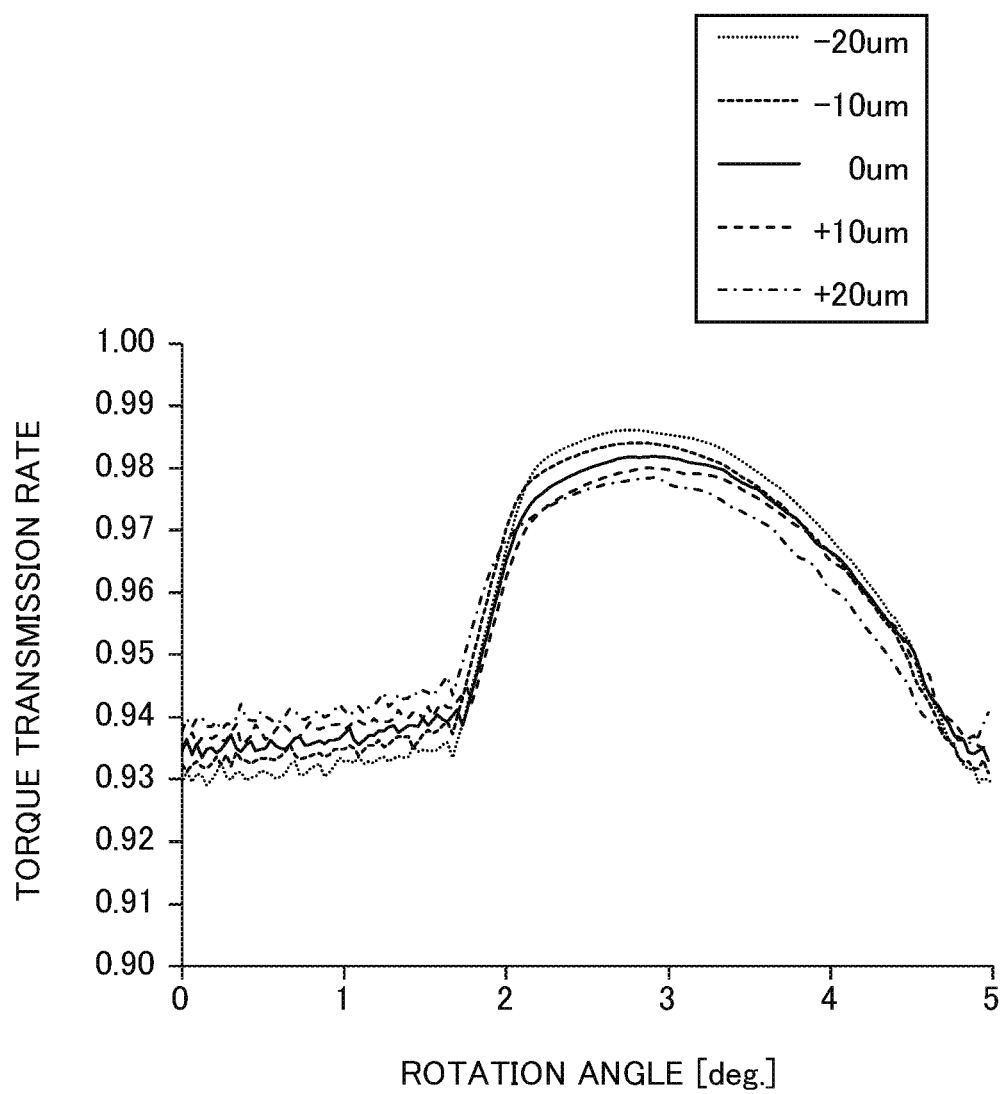
FIG. 6 is a graph showing torque transmission rates when a center distance between the gear and the pinion in the gear train mechanism of the timepiece of the embodiment is changed by a shift amount $\Delta a$ μm with respect to the normal 30 mm.

FIG. 6 is a graph showing the torque transmission rates when the center distance between the gear 10 and the pinion 20 in the gear train mechanism 1 of the timepiece of this embodiment is changed by the shift amount $\Delta\alpha$ μm with respect to the normal 3 mm. The horizontal axis of the graph shows the rotation angle of the gear 10 and the vertical axis of the graph shows the torque transmission rate. The torque transmission rate shown by the solid line in FIG. 6 with the shift amount $\Delta\alpha$ of 0 μm is the same as that in the graph of FIG. 2. In this case, the center distance is the normal 3 mm.

The rough broken line in FIG. 6 shows the toque transmission rate when the shift amount $\Delta\alpha$ is +10 μm which is longer than the normal center distance of 3 mm by 10 μm. In this case, the minimum torque transmission rate in the range of the constant torque transmission rate having a substantial constant torque transmission rate becomes larger than that when the center distance is the normal center distance and the maximum torque transmission rate in the range except the range of the constant torque transmission rate becomes smaller than that when the center distance is the normal center distance. The torque fluctuation therefore reduces to be smaller than that when the center distance is the normal center distance.

The one dot chain line in FIG. 6 shows the torque transmission rate when the shift amount $\Delta\alpha$ is +20 μm which is further longer than the shift amount $\Delta\alpha$ of +10 μm by 10 μm. In this case, the minimum torque transmission rate in the range of the constant torque transmission rate becomes larger than that when the shift amount $\Delta\alpha$ is +10 μm and the maximum torque transmission rate in the range except the range of the constant torque transmission rate becomes smaller than that when the shift amount $\Delta\alpha$ is +10 μm. The torque fluctuation therefore further reduces to be smaller than that when the shift amount $\Delta\alpha$ of the center distance is +10 μm.

The dense broken line in FIG. 6 shows the torque transmission rate when the shift amount $\Delta\alpha$ is −10 μm which is shorter than the normal center distance of 3 mm by 10 μm. In this case, the minimum torque transmission rate in the range of the constant torque transmission rate having a substantial constant torque rate becomes smaller than that when the center distance is the normal center distance and the maximum torque transmission rate in the range except the range of the constant torque transmission rate becomes larger than that when the center distance is the normal center distance. The torque fluctuation therefore increases to be larger than that when the center distance is the normal center distance.

The fine broken line in FIG. 6 shows the torque transmission rate when the shift amount $\Delta\alpha$ is −20 μm which is further shorter than the shift amount $\Delta\alpha$ of −10 μm by 10 μm. In this case, the minimum torque transmission rate in the constant torque transmission rate becomes smaller than that when the shift amount $\Delta\alpha$ is −10 μm and the maximum torque transmission rate in the range except the range of the constant torque transmission rate becomes larger than that when the shift amount $\Delta\alpha$ is −10 μm. The torque fluctuation therefore further increases to be larger than that when the shift amount $\Delta\alpha$ is −10 μm.

In the range of the shift amount $\Delta\alpha$ of the center distance of −20 μm to +20 μm, the gear 10 normally meshes with the pinion 20, and the torque fluctuation does not significantly change. Accordingly, in the range of the shift amount $\Delta\alpha$ of the center distance of −20 μm to +20 μm, the torque fluctuation of the gear train mechanism 1 of the timepiece of this embodiment reduces to be smaller than that of a conventional gear train mechanism of a timepiece shown by the broken line in FIG. 3.

The gear train mechanism 1 of the timepiece of this embodiment is formed by the combination of the gear 10 as the second wheel and the pinion 20 as the third wheel. However, the gear train mechanism of the timepiece according to the present disclosure is not limited to this combination. More specifically, various combinations may be used, for example, combination of a gear as a third wheel and a pinion as a fourth wheel, combination of a gear as a fourth wheel and a pinion as an escape wheel, and combination of other gears.

Method of Setting Tooth Profile of Tooth of Pinion

A specific method of setting the tooth profile 22 of the tooth 21 of the pinion 20 in the gear train mechanism 1 of the timepiece of the above embodiment is described hereinbelow. In addition, the pinion in the gear train mechanism of the timepiece according to the present disclosure is not limited to the one set by the following setting method. The following setting method is merely one example.

Figure 7:
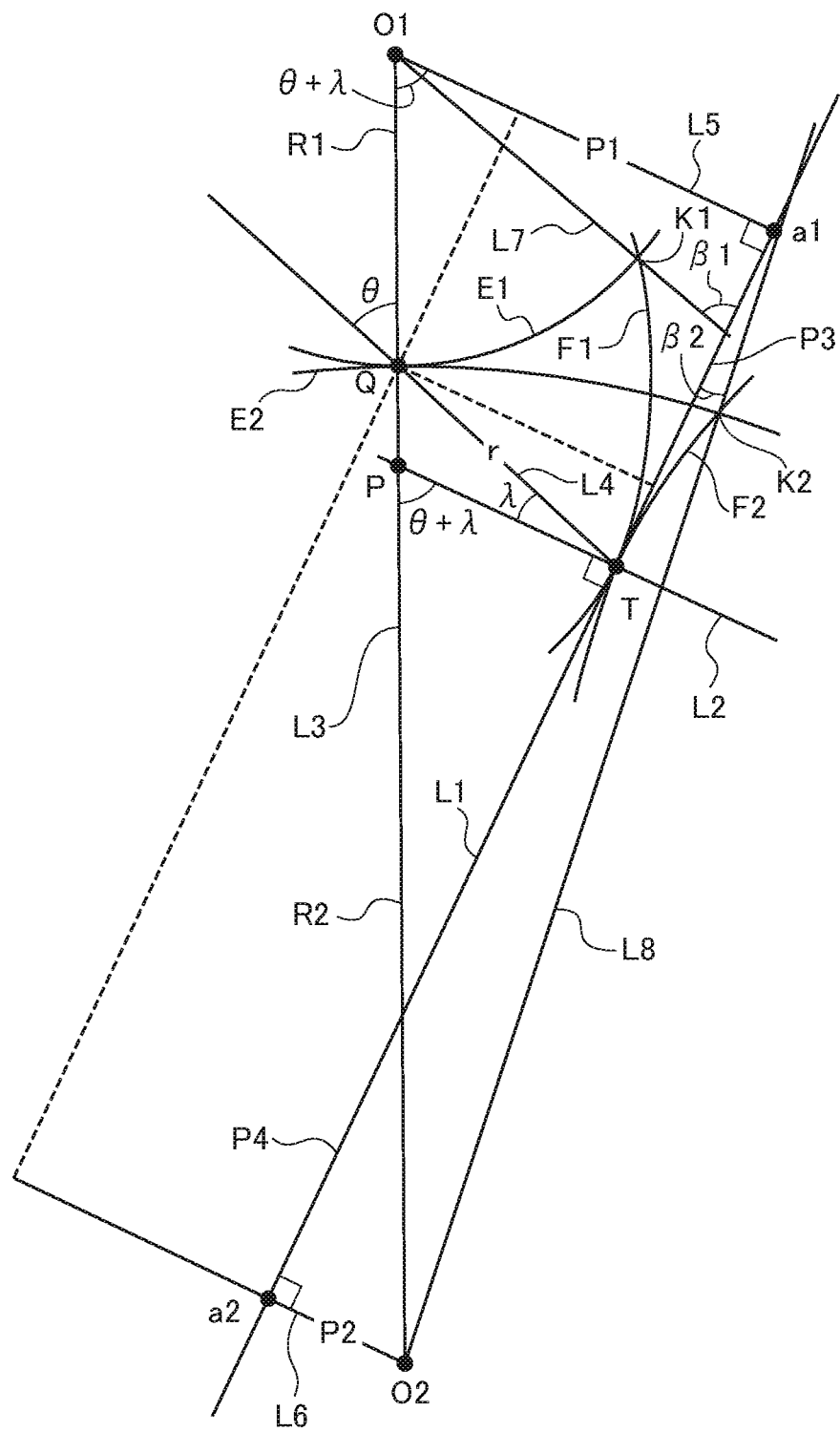
FIG. 7 is a schematic diagram for describing a specific setting method of a tooth profile of a tooth of the pinion.

FIG. 7 is a schematic diagram for describing a specific method of setting the tooth profile 22 of the tooth 21 of the pinion 20.

FIG. 7 shows a virtual gear 10' having the pressure angle $\alpha 1$ larger than the pressure angle of the gear 10 actually meshing with the pinion 20. In FIG. 7, O2 denotes the rotation center of the virtual gear 10', O1 denotes the rotation center of the pinion 20, T denotes the meshing point of the pinion 20 and the virtual gear 10', L2 denotes the normal line (common normal line) of a common tangential line L1 of the tooth profile of the virtual gear 10' and the pinion 20 at the meshing point T, P denotes the intersection point of the normal line L2 and a straight line L3, and $\lambda$ denotes a frictional angle. The normal line L2 is a normal line (common normal line) of the common tangential line L1 of the tooth profile of the virtual gear 10' and the pinion 20 at the meshing point T, and the straight line L3 connects the rotation centers O1, O2.

In FIG. 7, Q denotes the intersection point of a straight line L4 and the straight line L3. The straight line L4 inclines at the friction angle $\lambda$ from the common normal line L2 at the meshing point T. In FIG. 7, $\theta$ denotes the angle between the straight line L3 and the straight line L4, and a1, a2 denote the intersection point of the common tangential line L1 and each of perpendicular lines L5, L6 from each of the rotation centers O1, O2. R1 denotes the length from the rotation center O1 to the intersection point Q, R2 denotes the length from the rotation center O2 to the intersection point Q, P1 denotes the length from the rotation center O1 to the intersection point a1, and P2 denotes the length from the rotation center O2 to the intersection point a2. In this case, the lengths R1, R2 are set to be constant to rotate the pinion 20 with a substantial constant torque with respect to the virtual gear 10'.

Tooth form curves F1, F2 are represented by polar tangential coordinates (P1, β1) and polar tangential coordinates (P2, β2), respectively, where L7 represent the straight line as a standard line connecting the rotation center O1 and an intersection point K1 of the virtually set tooth form curve F1 and a circle E1 having a radius R1 with the rotation center O1 as a center, β1 represents the angle between the standard line L7 and the common tangential line L1, L8 represents the straight line as a standard line connecting the rotation center O2 and an intersection point K2 of the virtually set tooth form curve F2 and a circle E2 having a radius R2 with the rotation center O2 as a center, and β2 represents the angle between the standard line L8 and the common tangential line L1.

The tooth form curve F2 of the tooth 11 of the gear 10 is an involute. The polar tangential coordinates (P1, β1) of the tooth form curve F1 as the constant torque curve to the involute curve are calculated based on the polar tangential coordinates (P2, β2).

Namely, the following equation (1) is established under the condition in which the polar tangential coordinates (P2, β2) defining the tooth form curve F2 are an involute.

[Formula 1]

$$P2 = R2\cos(\alpha)\beta2 + R2\cos(\alpha)\{\tan(\alpha) - \alpha\} \quad (1)$$

In this equation, α represent the pressure angle α1 of the above-described virtual gear 10'.

The following equations (2), (3) are also established for the length P3 from the meshing point T to the intersection point a1 and for the length P4 from the meshing point T to the intersection point a2 based on the polar tangential coordinates.

[Formula 2]

$$P3 = \frac{dP1}{d\beta 1} \quad (2)$$

$$P4 = \frac{dP2}{d\beta 2} \quad (3)$$

In the approach contact, the following equations (4), (5), (6), (7) are established.

[Formula 3]

$$P1 = R1\cos(\theta + \lambda) + r\cos(\lambda) \quad (4)$$

$$P3 = R1\sin(\theta + \lambda) + r\sin(\lambda) \quad (5)$$

$$P2 = R2\cos(\theta + \lambda) - r\cos(\lambda) \quad (6)$$

$$P4 = R2\sin(\theta + \lambda) - r\sin(\lambda) \quad (7)$$

Accordingly, the tooth form curve F2 is obtained by the equations (1) to (7). More specifically, the polar coordinates (r, θ) corresponding to the path of the meshing point T are obtained by the equations (1), (3), (6), (7), and the polar tangential coordinates (P1, β1) are obtained by substituting the obtained value into the equations (2), (4), (5).

More specifically, P1 is obtained by substituting the polar coordinates (r, θ) into the equation (4). β1 becomes the following equation (8) by the equations (2), (4), (5).

[Formula 4]

$$\frac{d\beta 1}{d\theta} = \frac{-R1\sin(\theta + \lambda) + \frac{\cos(\lambda)}{\sin(\lambda)} R2 \cdot \cos(\theta + \lambda)}{(R1 + R2)\sin(\theta + \lambda) - R2\cos(\alpha)} \quad (8)$$

In the above equation (8), β1 is indefinite-integrated by the function of θ, the constant term c is obtained by the initial value, and β1 is obtained. More specifically, with tan$\{(\theta + \lambda)/2\} = t$, $R2\cos(\alpha) = Rg2$, when the equation (8) is indefinite-integrated by the function of t, the following equation (9) is obtained.

[Formula 5]

$$\beta 1 = \frac{R2}{\tan(\lambda) \cdot (R1 + R2)} \cdot \log\left(\frac{Rg2t^2 - 2(R1 + R2)t + Rg2}{t^2 + 1}\right) - $$

$$\frac{2R1\tan^{-1}(t)}{R1 + R2} + \frac{Rg2 \cdot R1}{(R1 + R2)\sqrt{(R1 + R2)^2 - Rg2^2}} \cdot $$

$$\log\left(\frac{Rg2t - (R1 + R2) - \sqrt{(R1 + R2)^2 - Rg2^2}}{Rg2t - (R1 + R2) + \sqrt{(R1 + R2)^2 - Rg2^2}}\right) + c$$

The constant term c in the equation (9) is obtained by substituting the initial value α into β1 and the initial value (π/2−α−λ) into θ. As described above, the polar tangential coordinates (P1, β1) defining the constant torque curve (tooth form curve F1) as the tooth profile of the pinion 20 are obtained. The constant torque curve (tooth form curve F1) corresponds to the involute curve (tooth form curve F2) as the tooth profile of the gear 10 defined by the polar tangential coordinates (P2, β2). The obtained pinion 20 thereby has a substantial constant torque to be transmitted from the gear 10 with which the pinion 20 actually meshes at least in a part of the first half of the meshing period.

Embodiment 2

Configuration of Gear Train Mechanism

In the gear train mechanism 1 of the above-described Embodiment 1, the tooth profile 22 of the tooth 21 of the pinion 20 is defined by the constant torque curve having a substantial constant torque to be transmitted from the virtual gear 10' to the pinion 20 in the meshing period from the start to the end of the meshing of the virtual gear 10' and the tooth 21 of the pinion 20. In this case, the constant torque curve meshes with the involute virtual gear 10' having the pressure angle α1 larger than the pressure angle α2 of the tooth 11. However, the gear train mechanism of the present disclosure is not limited this configuration.

More specifically, in the gear train mechanism of the present disclosure, the tooth profile 22 of the tooth 21 of the pinion 20 may be defined by the constant torque curve having a substantial constant torque to be transmitted from the virtual gear 10' to the pinion 20 in the meshing period from the start to the end of the meshing of the virtual gear 10' and the pinion 20. In this case, the constant torque curve meshes with the involute virtual gear 10' having the pressure angle $\alpha 1$ smaller than the pressure angle $\alpha 2$ of the tooth 11. The gear train mechanism 1 configured as described above may be Embodiment 2 of the gear train mechanism of the present disclosure.

Operation of Gear Train Mechanism

The gear train mechanism 1 of Embodiment 2 configured as described above has the number Z of the teeth 21 on the pinion 20 in the range of 11 to 20, for example. When the number Z of teeth 21 having the tooth profile 22 defined by the constant torque curve in the meshing period with the virtual gear 10' having the small pressure angle $\alpha 1$ is 11, 12, 13, 14, 15, 16, 17, 18, 19, 20, the torque fluctuation reduces while achieving appropriate meshing.

It is more preferable for the num Z of the teeth 21 on the pinion 20 to be the range of 16 to 20 in order to further reduce the torque fluctuation.

In the gear train mechanism 1 of the timepiece of Embodiment 2, it is preferable for the difference in pressure angle $\Delta\alpha$ to be larger than $-(Z/2)+5$, i.e., $-(Z/2)+5<\Delta\alpha$ in the range of the number Z of the teeth 21 on the pinion 20 illustrated in FIG. 4, i.e., in the range of 11, 12, 13, 14, 15, 16, 17, 18, 19, 20, in particular, in the range of 16 to 20.

In the gear train mechanism 1 of the timepiece of Embodiment 2, it is preferable for the difference in pressure angle $\Delta\alpha$ to be smaller than $-(Z/2)+8$, i.e., $\Delta\alpha<-(Z/2)+8$ in the range of the number Z of teeth on the pinion 20 illustrated in FIG. 4, i.e., in the range of 11, 12, 13, 14, 15, 16, 17, 18, 19, 20, in particular, in the range of 16 to 20. The torque transmission rate has the substantial constant value in the approach contact range and the maximum value in the recess contact range. The substantial constant value decreases and the maximum value increases in accordance with an increase in the difference in pressure angle $\Delta\alpha$ (as $\Delta\alpha$ is negative number, increase in $\Delta\alpha$ means $\Delta\alpha$ approaches 0), resulting in an increase in torque fluctuation. Accordingly, when the difference in pressure angle $\Delta\alpha$ is equal to $-(Z/2)+8$ or more, the torque fluctuation increases. On the other hand, when the difference in pressure angle $\Delta\alpha$ is smaller than $-(Z/2)+8$, the torque fluctuation reduces.

In the gear train mechanism 1 of the timepiece of Embodiment 2, it is more preferable for the difference in pressure angle $\Delta\alpha$ to be $\Delta\alpha<-(Z/2)+7$ in the range of the number of teeth Z on the pinion 20, i.e., in the range of 11, 12, 13, 14, 15, 16, 17, 18, 19, 20. In this range, $\Delta\alpha<-(Z/2)+7$, the torque fluctuation further reduces.

For the reasons stated above, when the number Z of teeth on the pinion 20 is 17, the difference $\Delta\alpha$ between the pressure angle $\alpha 1$ of the involute virtual gear 10' for use in the calculation of the constant torque curve defining the tooth profile 22 of the tooth 21 of the pinion 20 and the pressure angle $\alpha 2$ of the gear 10, i.e., $\Delta\alpha=\alpha 1-\alpha 2$, is set to be larger than $-3.5$ and smaller than $-0.5$ (preferably, smaller than $-1.5$). Such a difference in pressure angle $\Delta\alpha$ prevents the addendum of the pinion 20 from contacting a part of the gear 10 (for example, bottom of gear 10) which is not required for torque transmission. Accordingly, the gear train component of the timepiece having a substantial constant torque to be transmitted from the gear 10 to the pinion 20 can be obtained. When the pinion 20 has the preferable difference in pressure angle $\Delta\alpha$ of smaller than $-1.5$, the torque fluctuation reduces to be smaller than that when the pinion 20 has the difference in pressure angle $\Delta\alpha$ of smaller than $-0.5$.

Figure 8:
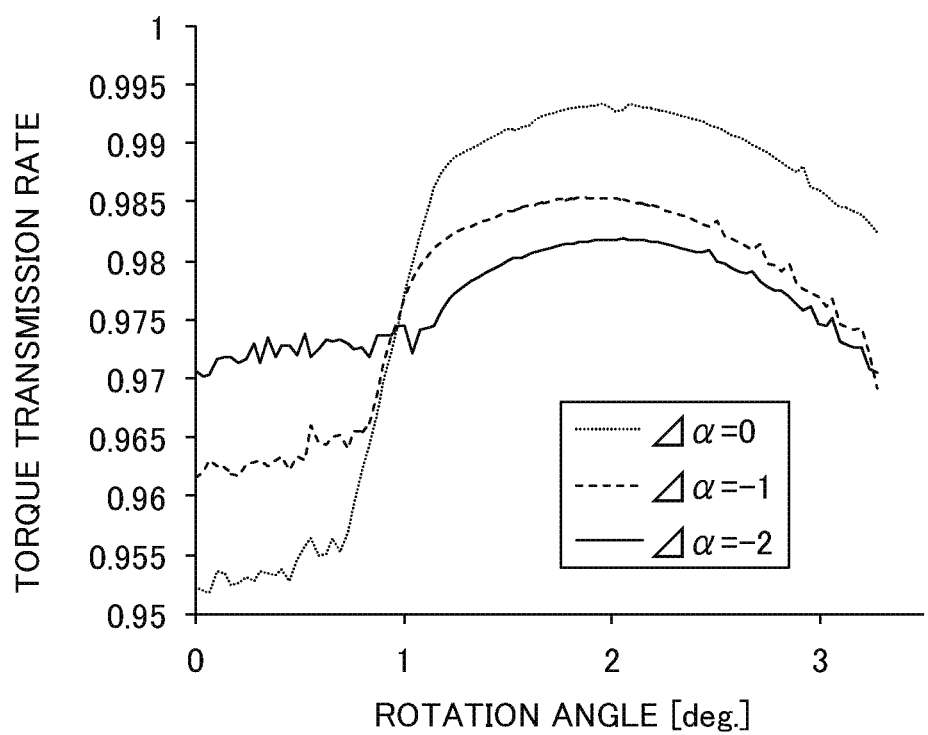
FIG. 8 is a graph showing torque transmission rates corresponding to FIG. 5 when the difference in pressure angle is changed to −2 degrees, −1 degree, and 0 degree in the gear train mechanism of Embodiment 2.

FIG. 8 is a graph showing the torque transmission rates corresponding to FIG. 5. The torque transmission rates shown in FIG. 8 are obtained when the difference in pressure angle $\Delta\alpha$ is changed to 0 degree, $-1$ degree, and $-2$ degrees in the gear train mechanism 1 of Embodiment 2 (the number Z of teeth on the pinion 20 is 17 and the number of teeth on the gear 10 meshing with the pinion 20 is 109, for example). In the graph, the horizontal axis shows the rotation angle of the gear 10 and the vertical axis shows the torque transmission rate. In FIG. 8, when the difference in pressure angle $\Delta\alpha$ is $-1$ degree, the value of the torque transmission rate which becomes substantially constant in the approach contact range is smaller than that when the difference in pressure angle $\Delta\alpha$ is $-2$ degrees, and the value of the torque transmission rate which becomes the maximum in the recess contact range is larger than that when the difference in torque transmission rate $\Delta\alpha$ is $-2$ degrees. The torque fluctuation therefore increases.

In FIG. 8, when the difference in pressure angle $\Delta\alpha$ is 0 degree, the value of the torque transmission rate which becomes substantially constant in the approach contact range further decreases to be smaller than that when the difference in pressure angle $\Delta\alpha$ is $-1$ degree and the value of the torque transmission rate which becomes the maximum in the recess contact range further increases to be larger than that when the difference in pressure angle $\Delta\alpha$ is $-1$ degree. The torque fluctuation therefore further increases. Accordingly, in order to reduce the torque fluctuation, it is preferable for the difference in pressure angle $\Delta\alpha$ to be smaller than $-(Z/2)+8$. In addition, in order to further reduce the torque fluctuation, it is more preferable for the difference in pressure angle $\Delta\alpha$ to be smaller than $-(Z/2)+7$.

The gear train mechanism of the timepiece of Embodiment 2 may be formed by various combinations such as the combination of the gear 10 as the second wheel and the pinion 20 as the third wheel, the combination of the gear as the third wheel and the pinion as the fourth wheel, the combination of the gear as the fourth wheel and the pinion as the escape wheel, the combination of the barrel wheel and the pinion as the second wheel, and the combination of the other gears.

Method of Setting Tooth Profile of Tooth of Pinion

As a specific method of setting the tooth profile 22 of the tooth 21 of the pinion 20 in the gear train mechanism 1 of the timepiece of Embodiment 2 is the same as the specific method of setting the tooth profile 22 of the tooth 21 of the pinion 20 in the gear train mechanism 1 of the timepiece of Embodiment 1, the description thereof is omitted. However, in the setting method described in Embodiment 1, the pressure angle $\alpha 1$ smaller than the pressure angle $\alpha 2$ of the gear 10 actually meshing with the pinion 20 is applied instead of the pressure angle $\alpha 1$ of the virtual gear 10'. The pinion in the gear train mechanism of the timepiece of this disclosure is not limited to the one set by the setting method described in Embodiment 1. The setting method is merely one example.

The gear train mechanism 1 of the Embodiment 1 includes the pinion 20 having the teeth 21 with a profile having the pressure angle $\alpha 1$ ($\Delta\alpha$ is positive) larger than the pressure angle $\alpha 2$ of the teeth of the meshing gear 10. The number Z of teeth on the pinion 20 is preferably 7 to 15. On the other hand, the gear train mechanism 1 of Embodiment 2 includes the pinion 20 having the teeth 21 with a profile having the pressure angle α1 (Δα is negative) smaller than the pressure angle α2 of the teeth of the meshing gear 10. The number Z of teeth on the pinion 20 is preferably 11 to 20.

Accordingly, when the number Z of teeth on the pinion 20 is preferably 11 to 15 for both in Embodiment 1 and Embodiment 2, the pressure angle may be a pressure angle larger than the pressure angle α2 of the teeth of the meshing gear 10, or a pressure angle smaller than the pressure angle α2 of the teeth of the meshing gear 10. When both pinions 20 are compared, it is preferable for the pressure angle to be smaller than the pressure angle α2 of the teeth of the meshing gear 10.

As described above, as the gear train mechanism 1 of a preferable example, the pinion 20 having 7 to 10 teeth is defined by the profile having the pressure angle α1 (Δα is positive) larger than the pressure angle α2 of the teeth of the meshing gear 10. The pinion 20 having 16 to 20 teeth is defined by the profile having the pressure angle α1 (Δα is negative) smaller than the pressure angle α2 of the teeth of the meshing gear 10. As the gear train mechanism 1 of a preferable example, the pinion 20 having 11 to 15 teeth may be defined by a profile having the pressure angle α1 (Δα is positive) larger than the pressure angle α2 of the teeth of the meshing gear 10, or a profile having a small pressure angle α1 (Δα is negative). It is more preferable for the pinion 20 to be defined by the profile having the pressure angle α1 (Δα is negative) smaller than the pressure angle α2 of the teeth of the meshing gear.

Embodiment 3

Configuration of Gear Train Mechanism

Figure 9:
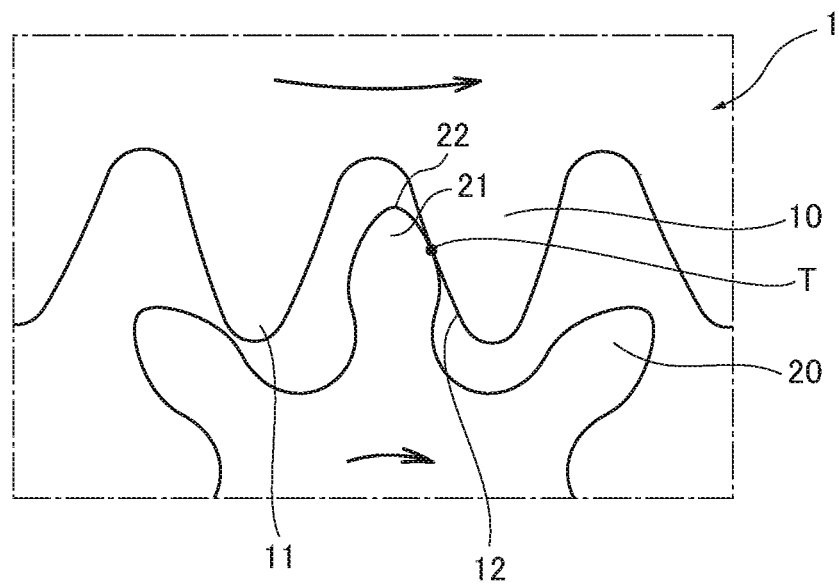
FIG. 9 is a schematic diagram illustrating a gear train mechanism of a portable timepiece (for example, watch) of Embodiment 3, and illustrating the contact of a tooth of a driving pinion and a tooth of a driven gear.

FIG. 9 is a schematic view illustrating a gear train mechanism 1 of a portable timepiece (for example, watch) of Embodiment 3 of the present disclosure. In FIG. 9, the tooth 21 of the driving pinion 20 contacts the tooth 11 of the driven gear 10. The gear train mechanism 1 illustrated in FIG. 9 is formed by the pinion 20 and the gear 10 for use in a gear train mechanism which winds a power spring of a mechanical timepiece, for example. The pinion 20 meshes with the gear 10 to transmit a torque from the pinion 20 to the gear 10 through a meshing point T at which the pinion 20 contacts the gear 10. The gear 10 rotates in an arrow direction (counterclockwise direction in FIG. 9) by the rotation of the pinion 20 in an arrow direction (clockwise direction in FIG. 9).

The gear 10 has 90 teeth 11 and a module size, m=0.090 mm, for example. The tooth profile 12 of each tooth 11 is defined by the involute curve such that the pressure angle α2 is set to 22 degrees.

On the other hand, the pinion 20 also has 8 teeth 21 and a module size, m=0.090 mm, for example. The tooth profile 22 of each tooth 21 is defined by a constant torque curve having a substantial constant torque to be transmitted from the pinion 20 to the virtual gear in the meshing period from the start to the end of the meshing of the tooth 21 of the pinion 20 and the virtual gear. In this case, the constant torque curve meshes with the involute virtual gear having the pressure angle α1 (for example, 20 degrees) smaller than the pressure angle α2 of the tooth 11.

Accordingly, the torque to be transmitted from the pinion 20 to the gear 10 becomes substantially constant at least in a part of the first half (for example, approach contact range) of the meshing period of the tooth 11 of the gear 10 and the tooth 21 of the pinion 20. The torque to be transmitted from the pinion 20 to the gear 10 also becomes substantially constant at least in a part of the second half (for example, recess contact range) of the meshing period of the tooth 11 of the gear 10 and the tooth 21 of the pinion 20. The distance (center distance) between the rotation center of the gear 10 and the rotation center of the pinion 20 is 4.41 mm, for example.

Operation of Gear Train Mechanism

Figure 10:
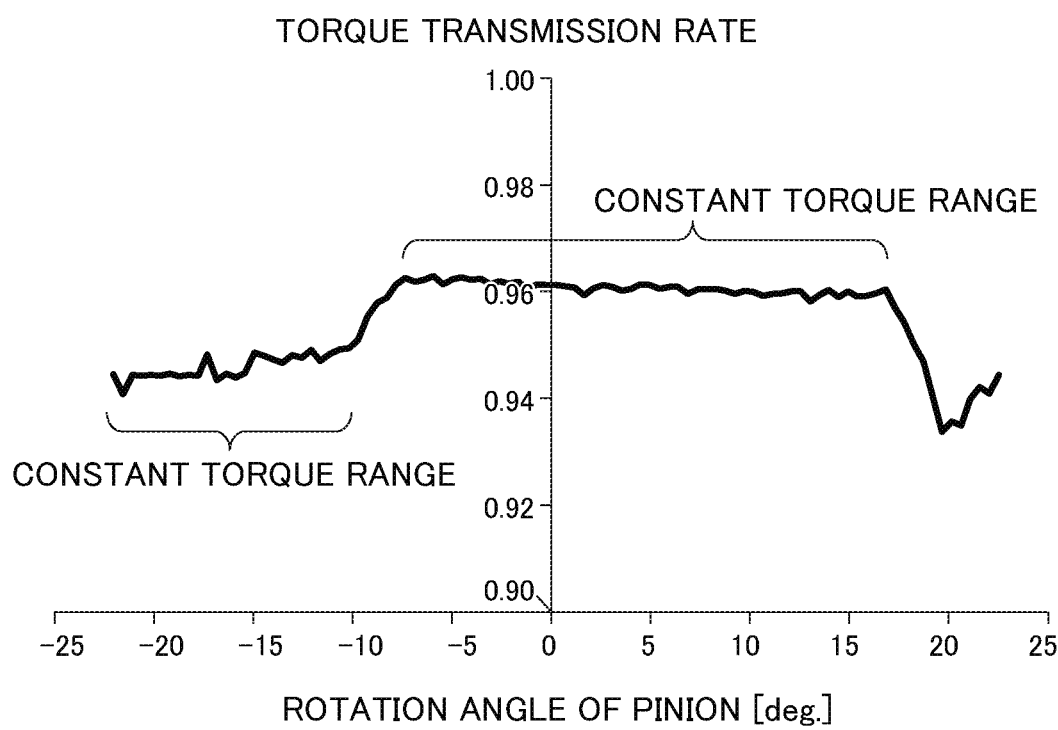
FIG. 10 is a graph showing a torque transmission rate from the pinion to the gear when the gear meshes with the pinion in the gear train mechanism of Embodiment 3.

FIG. 10 is a graph illustrating a torque transmission rate from the pinion 20 to the gear 10 when the gear 10 meshes with the pinion 20 in the gear train mechanism 1 of Embodiment 3. In the graph of FIG. 10, the negative range of the rotation angle of the pinion 20 in the horizontal axis shows the first half of the meshing period, and the positive range of the rotation angle of the pinion 20 shows the second half of the meshing period.

According to the graph illustrated in FIG. 10, the gear train mechanism 1 of the timepiece of Embodiment 3 has a substantial constant torque transmission rate (0.94 to 0.95) to be transmitted from the pinion 20 to the gear 10 in a part of the approach contact (range of rotation angle of about 12 degrees (−22 to −10 degrees) of pinion 20). The gear train mechanism 1 of the timepiece of Embodiment 3 also has a substantial constant torque transmission rate (about 0.96) to be transmitted from the pinion 20 to the gear 10 in a part of the recess contact (range of rotation angle of about 25 degrees (−8 to +17 degrees) of pinion 20).

Figure 11:
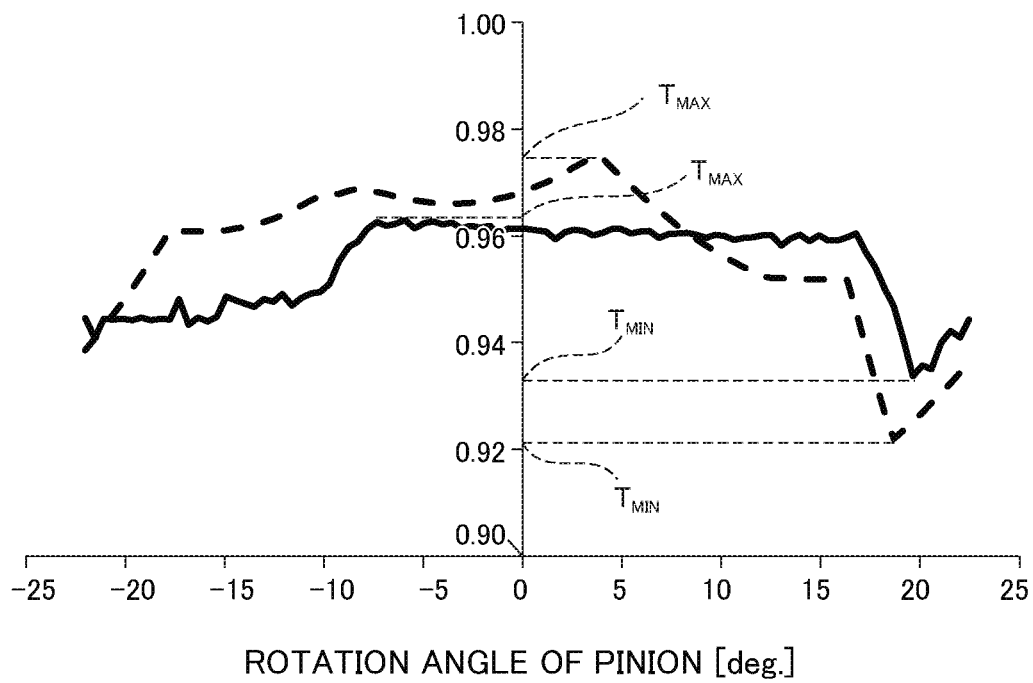
FIG. 11 is a graph showing a torque transmission rate (solid line) of the gear train mechanism of Embodiment 3 and a torque transmission rate (broken line) of a conventional gear train mechanism of a timepiece to which the present disclosure is not applied.

FIG. 11 is a graph showing the torque transmission rate (solid line) of the gear train mechanism 1 of Embodiment 3 and the torque transmission rate (dashed line) of a conventional gear train mechanism of a timepiece to which the present disclosure is not applied. In the graph of FIG. 11, the horizontal axis shows the rotation angle of the pinion 20 and the vertical axis shows the torque transmission rate. In FIG. 11, the torque transmission rate of the gear train mechanism 1 of the timepiece of this embodiment shown by the solid line is the same as that illustrated in FIG. 10. The torque transmission rate has the minimum value $T_{MIN}$ and the maximum value $T_{MAX}$.

The conventional gear train mechanism of the timepiece illustrated by the broken line in FIG. 11 is a typical gear train mechanism. The gear train mechanism is formed by a gear including an involute tooth profile and a pinion including a tooth profile by ETA SA (not profile of constant torque curve). The minimum value $T_{MIN}$ of the torque transmission rate is slightly larger than 0.92 and this value is smaller than the minimum value $T_{MIN}$ (slightly larger than 0.93) of the torque transmission rate in the gear train mechanism 1 of Embodiment 3. The maximum value $T_{MAX}$ of the torque transmission rate in the general gear train mechanism is slightly larger than 0.97, and this value is larger than the maximum value $T_{MAX}$ (slightly larger than 0.96) of the torque transmission rate in the gear train mechanism 1 of Embodiment 3.

The gear train mechanism 1 of the timepiece of Embodiment 3 has a substantial constant torque transmission rate with a tolerance value of 0.01 or below both in a part of the approach contact and a part of the recess contact in the meshing period of the gear 10 and the pinion 20. The torque fluctuation which is the difference between the maximum value $T_{MAX}$ and the minimum value $T_{MIN}$ of the torque transmission rate in the gear train mechanism 1 of the timepiece of Embodiment 3 reduces to be smaller than that in the conventional gear train mechanism of the timepiece to which the present disclosure is not applied. The conventional gear train mechanism of the timepiece is represented by the broken line in FIG. 11. The gear train mechanism 1 of the timepiece of Embodiment 3 stably operates.

Modified Example

The gear train mechanism 1 of the timepiece of Embodiment 3 includes the pinion 20 having 8 teeth 21. The number Z of the teeth 21 on the pinion 20 is not limited to 8, and may be 7 to 12. As described above, when the number Z of the teeth 21 on the pinion 20 is equal to 6 or below and is equal to 13 or more, the pinion 20 inappropriately meshes with the gear 10. When the number Z of teeth 21 on the pinion is 7, 8, 9, 10, 11, 12, the torque fluctuation is effectively controlled while achieving the appropriate meshing. In this case, the tooth profile 22 of the tooth 21 of the pinion 20 is defined by the constant torque curve in the meshing period meshing with the virtual gear 10' having the small pressure angle $\alpha 1$.

Figure 12:
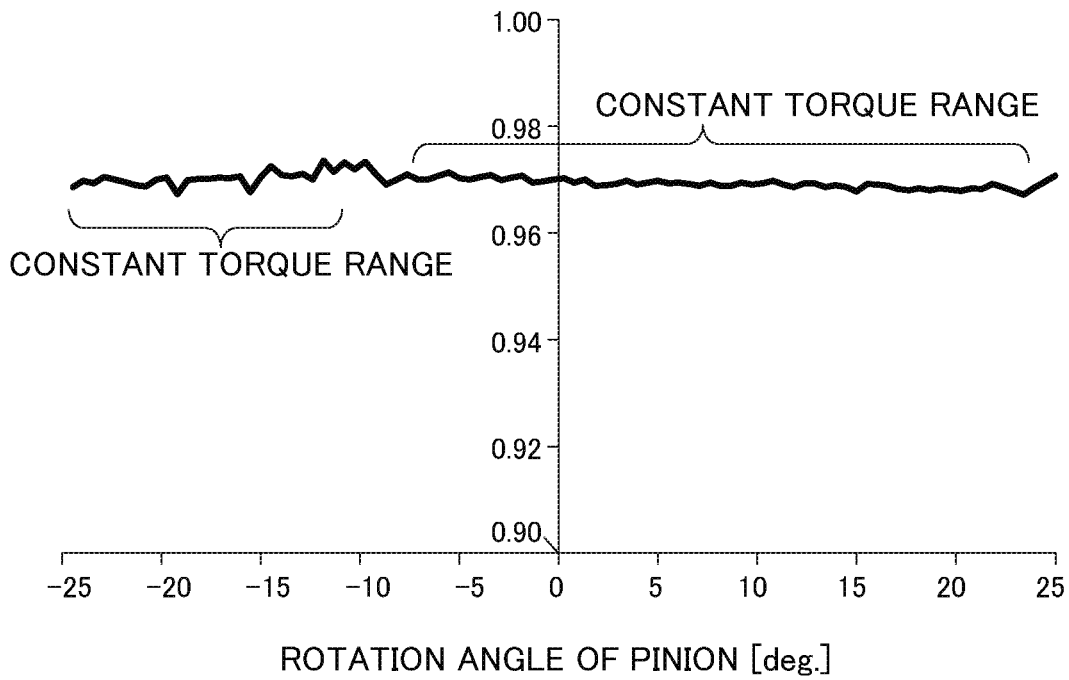
FIG. 12 is a graph showing a torque transmission rate in a gear train mechanism of a modified example including a pinion having 12 teeth, the gear train mechanism being configured to have a substantial constant torque to be transmitted from the pinion to the gear at least in a part of a first half of the meshing period of the gear and the pinion and at least in a part of a second half of the meshing period.

FIG. 12 is a graph showing a torque transmission rate in the gear train mechanism 1 of the modified example. The gear train mechanism 1 includes the pinion 20 having 12 teeth 21, and a substantial constant torque to be transmitted from the pinion 20 to the gear 10 at least in a part of the first half of the meshing period of the gear 10 and the pinion 20 and at least in a part of the second half of the meshing period. In the graph of FIG. 12, the horizontal axis shows the rotation angle of the pinion 20 and the vertical axis shows the torque transmission rate. In addition, the torque transmission rate illustrated in FIG. 12 is obtained by the combination of the gear 10 and the pinion 20. The gear 10 has 90 teeth 11 and a module size, m=0.090 mm, for example. The tooth profile 12 of the tooth 11 is defined by the involute curve such that the pressure angle $\alpha 2$ is set to 20 degrees. The pinion 20 has 8 teeth 21 and a module size, m=0.090 mm. The pinion 20 meshes with the virtual gear corresponding to the involute tooth profile 22 of the tooth 21 having the pressure angle $\alpha 1$ of 20 degrees.

When the number of the teeth 21 on the pinion 20 is 12, the pressure angle $\alpha 1$ of the pinion 20 may be set to be equal to the pressure angle $\alpha 2$ of the gear 10 as long as the pinion 20 has the substantial constant torque to be transmitted from the pinion 20 to the gear 10 at least in a part of the first half of the meshing period of the gear 10 and the pinion 20 and at least in a part of the second half of the meshing period. According to the gear train mechanism 1 configured as described above, the fluctuation in torque to be transmitted from the pinion 20 to the gear 10 can be controlled as shown in FIG. 12 while achieving appropriate meshing.

It is more preferable for the number Z of the teeth 21 on the pinion 20 in the gear train mechanism 1 to be the range of 7 to 10. In this case, the torque fluctuation further reduces.

Figure 13:
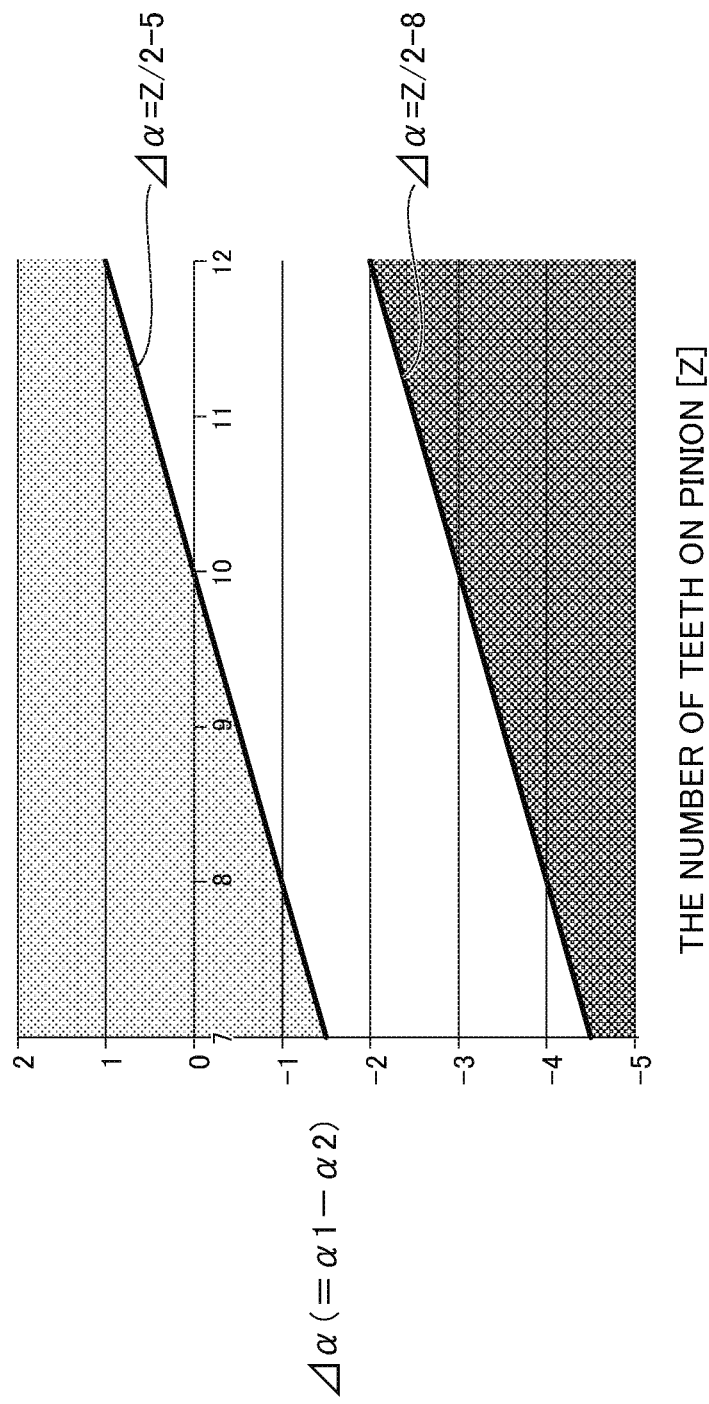
FIG. 13 is a graph showing correspondence between the number of teeth on the pinion and the difference in pressure angle $\Delta\alpha$.

FIG. 13 is a graph showing correspondence between the number Z of teeth on the pinion 20 and the difference in pressure angle $\Delta\alpha$. The difference in pressure angle $\Delta\alpha$ is a difference between the pressure angle $\alpha 1$ of the involute virtual gear 10' for use in the calculation of the constant torque curve defining the tooth profile 22 of the tooth 21 of the pinion 20 and the pressure angle $\alpha 2$ of the involute tooth profile 12 of the tooth 11 of the gear 10 with which the pinion 20 actually meshes, i.e., $\Delta\alpha=\alpha 1-\alpha 2$.

It is preferable for the gear train mechanism 1 of the timepiece of Embodiment 3 to have the difference in pressure angle $\Delta\alpha$ larger than $(Z/2)-8$ and smaller than $(Z/2)-5$, i.e., $(Z/2)-8<\Delta\alpha<(Z/2)-5$, in the range of the number Z of teeth on the pinion 20 shown in FIG. 13, i.e., in the range of 7, 8, 9, 10, 11, 12. When the difference in pressure angle $\Delta\alpha$ is smaller than $(Z/2)-8$ and larger than $(Z/2)-5$, the addendum of the pinion 20 may contact the addendum of the gear 10, which may disturb the appropriate meshing.

However, when the difference in pressure angle $\Delta\alpha$ is larger than $(Z/2)-8$ and smaller than $(Z/2)-5$, i.e., $(Z/2)-8<\Delta\alpha<(Z/2)-5$, the addendum of the pinion 20 may not contact the addendum of the gear 10, which achieves the appropriate meshing and reduces the fluctuation in torque to be transmitted from the pinion 20 to the gear 10.

It is more preferable for the number Z of teeth on the pinion 20 in the gear train mechanism 1 of the timepiece of Embodiment 3 to be 7, 8, 9, 10 under the condition that the difference in pressure angle $\Delta\alpha$ is negative.

The involute tooth profile of the tooth 11 of the gear 10 in the gear train mechanism 1 of Embodiment 3 has the pressure angle $\alpha 2$ of 22 degrees. However, the involute tooth profile of the tooth of the gear in the gear train mechanism of the timepiece according to the present disclosure is not limited to have the pressure angle $\alpha 2$ of 22 degrees. The pressure angle $\alpha 2$ may be 18 degrees, 19 degrees, 20 degrees, 21 degrees, 23 degrees, 24 degrees, and 25 degrees in addition to 22 degrees. The pressure angles $\alpha 1$, $\alpha 2$ may be an angle including a decimal point such as 22.5 degrees, 23.4 degrees.

Figure 14:
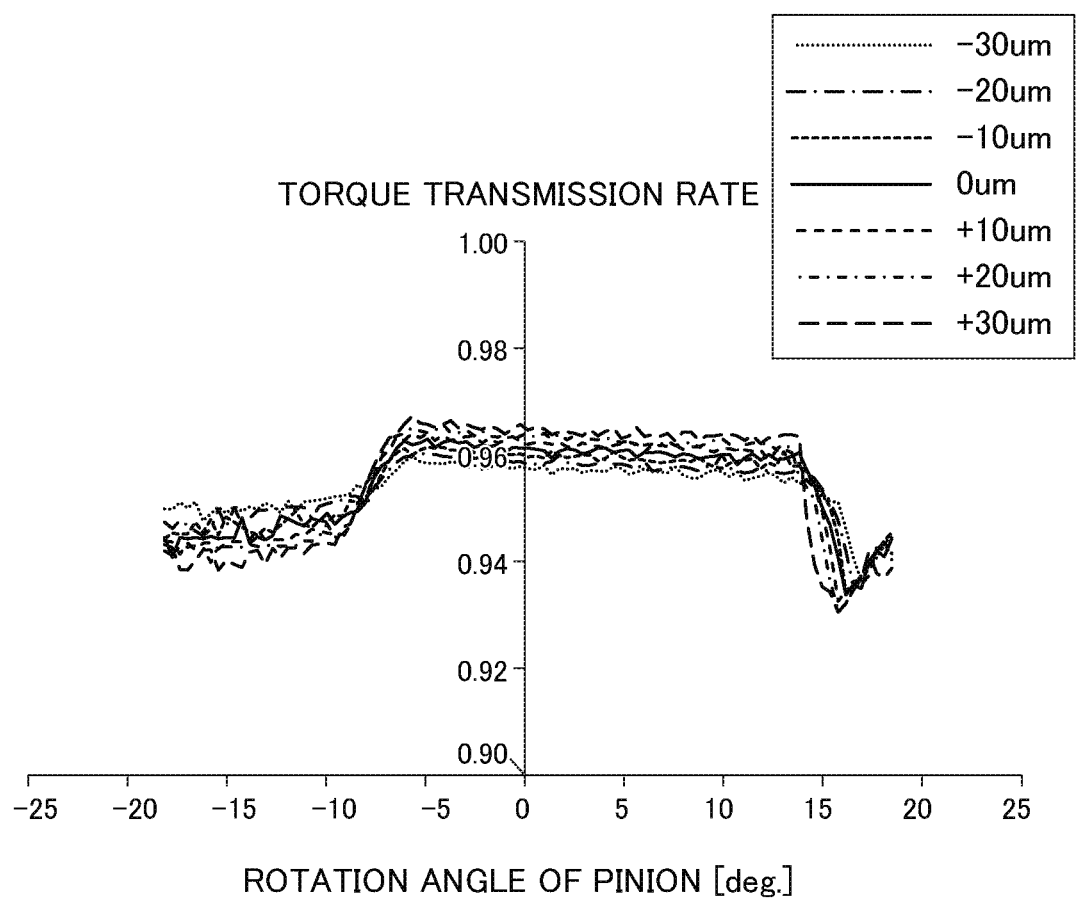
FIG. 14 is a graph showing torque transmission rates when a center distance between the gear and the pinion in the gear train mechanism of the timepiece of Embodiment 3 is changed by the shift amount Δα μm with respect to the normal 4.41 mm.

FIG. 14 is a graph showing the torque transmission rate when the center distance between the gear 10 and the pinion 20 in the gear train mechanism 1 of the timepiece of Embodiment 3 is changed by the shift amount $\Delta a$ μm with respect to the normal center distance of 4.41 mm. In the graph of FIG. 14, the horizontal axis shows the rotation angle of the pinion 20 and the vertical axis shows the torque transmission rate. In FIG. 14, the torque transmission rate when the shift amount $\Delta a$ is 0 μm which is shown by the solid line is the torque transmission rate when the center distance is the normal 4.41 mm which is the same as that in the graph of FIG. 10.

The rough short broken line of FIG. 14 shows the torque transmission rate when the shift amount $\Delta a$ is +10 μm which is longer than the normal distance of 4.41 mm by 10 μm. In this case, the minimum torque transmission rate in the range of the substantial constant torque transmission rate, which is in the first half of the meshing period, is smaller than that when the center distance is the normal center distance, and the maximum torque transmission rate in the range of the substantial constant torque transmission rate, which is in the second half of the meshing period, is larger than that when the center distance is the normal center distance. The torque fluctuation therefore increases to be larger than that when the center distance is the normal center distance.

The short one dot chain line of FIG. 14 shows the torque transmission rate when the shift amount $\Delta a$ is +20 μm which is longer than the shift amount $\Delta a$ of +10 μm by 10 μm. In this case, the minimum torque transmission rate in the range of the substantial constant torque transmission rate, which is in the first half of the meshing period, is smaller than that when the shift amount $\Delta a$ is +10 μm, and the maximum torque transmission rate in the range of the substantial constant torque transmission rate, which is in the second half of the meshing period, is larger than that when the shift amount $\Delta a$ is +10 μm. The torque fluctuation therefore further increases to be larger than that when the shift amount $\Delta a$ is +10 μm.

The rough long broken line of FIG. 14 shows the torque transmission rate when the shift amount $\Delta a$ is +30 μm which is longer than the shift amount $\Delta a$ of +20 μm by 10 μm. In this case, the minimum torque transmission rate in the range of the substantial constant torque transmission rate, which is in the first half of the meshing period, is smaller than that when the shift amount Δa is +20 μm, and the maximum torque transmission rate in the range of the substantial constant torque transmission rate, which is in the second half of the meshing period, is larger than that when the shift amount Δa is +20 μm. The torque fluctuation therefore further increases to be larger than that when the shift amount Δa is +20 μm.

The dense short broken line of FIG. 14 shows the torque transmission rate when the shift amount Δa is −10 μm which is shorter than the normal distance of 4.41 mm by 10 μm. In this case, the minimum torque transmission rate in the range of the substantial constant torque transmission rate, which is in the first half of the meshing period, is larger than that when the center distance is the normal center distance and the maximum torque transmission rate in the substantial constant torque transmission rate, which is in the second half of the meshing period, is smaller than that when the center distance is the normal distance. The toque fluctuation therefore reduces to be smaller than that when the center distance is the normal center distance.

The long one dot chain line of FIG. 14 shows the torque transmission rate when the shift amount Δa is −20 μm which is shorter than the shift amount Δa of −10 μm by 10 μm. In this case, the minimum torque transmission rate in the range of the substantial constant torque transmission rate, which is in the first half of the meshing period, is larger than that when the shift amount Δa is −10 μm, and the maximum torque transmission rate in the range the substantial constant torque transmission rate, which is in the second half of the meshing period, is smaller than that when the shift amount Δa is −10 μm. The torque fluctuation therefore further reduces to be smaller than that when the shift amount Δa is −10 μm.

The fine broken line of FIG. 14 shows the torque transmission rate when the shift amount Δa is −30 μm which is shorter than the shift amount Δa of −20 μm by 10 μm. In this case, the minimum torque transmission rate in the range of the substantial constant torque transmission rate, which is in the first half of the meshing period, is larger than that when the shift amount Δa is −20 μm, and the maximum torque transmission rate in the range of the substantial constant torque transmission rate, which is in the second half of the meshing period, is smaller than that when the shift amount Δa is −20 μm. The torque fluctuation therefore further reduces to be smaller than that when the shift amount Δa is −20 μm.

However, in the range of the shift amount Δa of −30 μm to +30 μm, the gear 10 appropriately meshes with the pinion 20, and the torque fluctuation does not significantly change. Accordingly, in the range of the shift amount Δa of −30 μm to +30 μm, the torque fluctuation of the gear train mechanism 1 of the timepiece of Embodiment 3 reduces to be smaller than that of the conventional gear train mechanism shown by the dashed line in FIG. 11.

The gear train mechanism 1 of the timepiece of Embodiment 3 is formed by the combination of the pinion 20 and the gear 10 for use in the gear train mechanism which winds the power spring. However, the gear train mechanism of the timepiece of this disclosure is not limited to this combination.

Setting Method of Tooth Profile of Tooth of Pinion

As a specific setting method of the tooth profile 22 of the tooth 21 of the pinion 20 in the gear train mechanism 1 of the timepiece of Embodiment 3 is the same as the specific setting method of the tooth profile 22 of the tooth 21 of the pinion 20 in the gear train mechanism 1 of the timepiece of Embodiment 1, the description thereof is omitted. However, in the setting method described in Embodiment 1, the pressure angle α1 smaller than the pressure angle α2 of the gear 10 actually meshing with the pinion 20 is applied instead of the pressure angle α1 of the virtual gear 10'. In addition, the pinion in the gear train mechanism of the timepiece according to this disclosure is not limited to the one set by the setting method described in Embodiment 1. The setting method is merely one example.

The gear train mechanism 1 of each of the embodiments and the modified example is merely one preferable example. The technical scope of the gear train mechanism of the present disclosure is not limited to each of these embodiments and the modified example.

What is claimed is:

1. A gear train mechanism of a timepiece, comprising:
   a gear including a tooth having a tooth profile of an involute curve; and
   a pinion including a tooth meshing with the tooth of the gear to transmit and receive a torque, wherein:
   the torque to be transmitted from one of the gear and the pinion to the other of the gear and the pinion is substantially constant at least in a part of a first half of a meshing period of the gear and the pinion, and
   a tooth profile of the pinion is set to a constant torque curve having a substantial constant torque to be transmitted from a virtual gear different from the gear, the virtual gear including an involute profile having a pressure angle larger than a pressure angle of the involute curve of the gear to the pinion when the tooth of the pinion meshes with a tooth of the virtual gear.

2. The gear train mechanism of the timepiece according to claim 1, wherein a number of teeth on the pinion is equal to 7 or more and equal to 15 or below.

3. A gear train mechanism of a timepiece, comprising:
   a gear including a tooth having a tooth profile of an involute curve; and
   a pinion including a tooth meshing with the tooth of the gear to transmit and receive a torque, wherein:
   the torque to be transmitted from one of the gear and the pinion to the other of the gear and the pinion is substantially constant at least in a part of a first half of a meshing period of the gear and the pinion, and
   wherein a tooth profile of the pinion is set to a constant torque curve having a substantial constant torque to be transmitted from a virtual gear different from the gear, the virtual gear including an involute profile having a pressure angle smaller than a pressure angle of the involute curve of the gear to the pinion when the tooth of the pinion meshes with a tooth of the virtual gear including an involute profile having a pressure angle smaller than a pressure angle of the involute curve of the gear.

4. The gear train mechanism of the timepiece according to claim 3, wherein a number of teeth on the pinion is equal to 11 or more and equal to 20 or below.

5. The gear train mechanism of the timepiece according to claim 1, wherein a difference Δα between the pressure angle α2 of the gear and the pressure angle α1 of the involute profile of the tooth of the virtual gear, represented by Δα=α1−α2, satisfies a following condition, $$-Z/2+5 < \Delta\alpha < -Z/2+8.$$

6. A gear train mechanism of a timepiece, comprising:
a gear including a tooth having a tooth profile of an involute curve; and
a pinion including a tooth meshing with the tooth of the gear to transmit and receive a torque, wherein:
the torque to be transmitted from one of the gear and the pinion to the other of the gear and the pinion is substantially constant at least in a part of a first half of a meshing period of the gear and the pinion,
the torque to be transmitted from the pinion to the gear is substantially constant at least in a part of a second half of the meshing period, and
a tooth profile of the pinion is set to a constant torque curve having a substantial constant torque to be transmitted from the pinion to a virtual gear different from the gear, the virtual gear including an involute profile having a pressure angle smaller than a pressure angle of the involute curve of the gear when the tooth of the pinion meshes with a tooth of the virtual gear.

7. The gear train mechanism of the timepiece according to claim 6, wherein a number of teeth on the pinion is equal to 7 or more and equal to 12 or below.

8. The gear train mechanism of the timepiece according to claim 6, wherein a difference $\Delta\alpha$ between the pressure angle $\alpha 2$ of the gear and the pressure angle $\alpha 1$ of the involute profile of the tooth of the virtual gear, represented by $\Delta\alpha=\alpha 1-\alpha 2$, satisfies a following condition, $$Z/2-8<\Delta\alpha<Z/2-5.$$

9. The gear train mechanism of the timepiece according to claim 3, wherein a difference $\Delta\alpha$ between the pressure angle $\alpha 2$ of the gear and the pressure angle $\alpha 1$ of the involute profile of the tooth of the virtual gear, represented by $\Delta\alpha=\alpha 1-\alpha 2$, satisfies a following condition, $$-Z/2+5<\Delta\alpha<-Z/2+8.$$

* * * * *

UNITED STATES PATENT AND TRADEMARK OFFICE
CERTIFICATE OF CORRECTION

PATENT NO. : 10,895,844 B2
APPLICATION NO. : 16/312950
DATED : January 19, 2021
INVENTOR(S) : Tadahiro Fukuda Page 1 of 1

It is certified that error appears in the above-identified patent and that said Letters Patent is hereby corrected as shown below:

On the Title Page

Item (71), under Applicant, delete "Nishitokyo (JP)" and insert --Tokyo (JP)--.

In the Claims

In Column 18, Claim 3, Line 48, delete "wherein a" and insert --a--.

In Column 18, Claim 3, Lines 55-57, delete "gear including an involute profile having a pressure angle smaller than a pressure angle of the involute curve of the gear." and insert --gear.--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*